(12) United States Patent
Newman et al.

(10) Patent No.: US 8,363,998 B2
(45) Date of Patent: Jan. 29, 2013

(54) VERTICAL CABLE MANAGEMENT SYSTEM

(75) Inventors: David P. Newman, Glen Ellyn, IL (US); Robert L. Fritz, Elwood, IL (US); Stanley P. Evans, Jr., Tinley Park, IL (US); Clark M. Kromenaker, Yorkville, IL (US); Nathan A. Gleghorn, Chicago, IL (US)

(73) Assignee: Panduit Corp., Tinley Park, IL (US)

( * ) Notice: Subject to any disclaimer, the term of this patent is extended or adjusted under 35 U.S.C. 154(b) by 187 days.

(21) Appl. No.: 12/693,721

(22) Filed: Jan. 26, 2010

(65) Prior Publication Data

US 2010/0290752 A1 Nov. 18, 2010

Related U.S. Application Data

(60) Provisional application No. 61/147,531, filed on Jan. 27, 2009.

(51) Int. Cl.
*G02B 6/00* (2006.01)
*G02B 6/46* (2006.01)

(52) U.S. Cl. ...................................... 385/135
(58) Field of Classification Search .................. None
See application file for complete search history.

(56) References Cited

U.S. PATENT DOCUMENTS

| | | | |
|---|---|---|---|
| 4,648,517 A | 3/1987 | Schäfer | |
| 5,391,084 A | 2/1995 | Kreitzman | |
| D360,189 S | 7/1995 | Orlando | |
| 5,746,331 A | 5/1998 | Kurtis | |
| 5,788,087 A | 8/1998 | Orlando | |
| 5,853,155 A | 12/1998 | Sullivan et al. | |
| 6,044,193 A | 3/2000 | Szentesi et al. | |
| 6,127,631 A | 10/2000 | Green et al. | |
| D440,210 S | 4/2001 | Larsen et al. | |
| 6,254,041 B1 | 7/2001 | Dufourg | |
| 6,347,714 B1 | 2/2002 | Fournier et al. | |
| 6,365,834 B1 | 4/2002 | Larsen et al. | |
| 6,423,898 B1 | 7/2002 | Croker | |
| 6,425,488 B1 | 7/2002 | Notohardjono et al. | |
| 6,489,565 B1 | 12/2002 | Krietzman et al. | |
| 6,501,899 B1 | 12/2002 | Marrs et al. | |
| 6,541,705 B1 | 4/2003 | McGrath | |
| 6,584,267 B1 | 6/2003 | Caveney et al. | |

(Continued)

FOREIGN PATENT DOCUMENTS

FR 2896822 A1 8/2007
GB 1186459 4/1970

(Continued)

OTHER PUBLICATIONS www.panduitncg.com/products/PatchRunner_Roadmap.pdf, 1 page, Mar. 28, 2003.

*Primary Examiner* — Michelle R Connelly
(74) *Attorney, Agent, or Firm* — Robert A. McCann; Christopher S. Clancy; James H. Williams

(57) ABSTRACT

Certain embodiments of the present invention provide a cable manager. The cable manager includes a first side panel, a second side panel spaced apart from the first side panel, a first cross brace bracket connected to the first side panel and the second side panel, and a second cross brace bracket connected to the first side panel and the second side panel and spaced apart from the first cross brace bracket. The first side panel, the second side panel, the first cross brace bracket, and the second cross brace bracket define a first cable pathway for routing a first plurality of cables and a second cable pathway for routing a second plurality of cables.

20 Claims, 40 Drawing Sheets

U.S. PATENT DOCUMENTS

| | | | |
|---|---|---|---|
| 6,598,270 B2 | 7/2003 | Larsen et al. | |
| 6,605,782 B1 | 8/2003 | Krietzman et al. | |
| 6,646,893 B1 | 11/2003 | Hardt et al. | |
| 6,671,447 B1 | 12/2003 | Gehrke | |
| 6,708,830 B2 | 3/2004 | Mendoza | |
| 6,768,858 B2 | 7/2004 | Tinucci et al. | |
| 6,863,188 B2 | 3/2005 | Besserer et al. | |
| 6,920,273 B2 * | 7/2005 | Knudsen | 385/135 |
| 6,953,896 B2 | 10/2005 | Kleeberger et al. | |
| 6,974,037 B2 | 12/2005 | Haney | |
| 7,083,051 B2 | 8/2006 | Smith et al. | |
| 7,092,258 B2 | 8/2006 | Hardt et al. | |
| 7,119,282 B2 | 10/2006 | Krietzman et al. | |
| 7,168,576 B2 | 1/2007 | Williams | |
| 7,233,732 B2 | 6/2007 | Clark et al. | |
| 7,281,633 B2 | 10/2007 | Hartman et al. | |
| 7,285,027 B2 | 10/2007 | McGrath et al. | |
| 7,331,473 B2 | 2/2008 | Smith et al. | |
| 7,345,241 B2 | 3/2008 | Caveney et al. | |
| 7,352,941 B2 | 4/2008 | Bratkovski et al. | |
| 7,362,941 B2 | 4/2008 | Rinderer et al. | |
| 7,431,610 B2 | 10/2008 | Laursen | |
| 2003/0026084 A1 | 2/2003 | Lauchner | |
| 2003/0173320 A1 | 9/2003 | Linney, II et al. | |
| 2005/0247650 A1 | 11/2005 | Vogel et al. | |
| 2006/0059802 A1 * | 3/2006 | McNutt et al. | 52/220.7 |
| 2006/0113433 A1 | 6/2006 | Chen et al. | |
| 2006/0162948 A1 * | 7/2006 | Rinderer et al. | 174/50 |
| 2006/0228087 A1 | 10/2006 | Bayazit et al. | |
| 2008/0108231 A1 * | 5/2008 | Caveney et al. | 439/76.1 |
| 2008/0130262 A1 | 6/2008 | Rinderer et al. | |
| 2009/0016043 A1 | 1/2009 | Hruby et al. | |
| 2009/0236117 A1 | 9/2009 | Garza et al. | |
| 2009/0237880 A1 | 9/2009 | Levesque et al. | |
| 2010/0078529 A1 | 4/2010 | Taylor | |
| 2010/0166378 A1 * | 7/2010 | Taylor | 385/135 |

FOREIGN PATENT DOCUMENTS

| | | |
|---|---|---|
| WO | 03068022 A2 | 8/2003 |
| WO | 2005009321 A2 | 10/2005 |
| WO | 2008094978 A2 | 8/2008 |
| WO | 2010025855 A1 | 3/2010 |

* cited by examiner

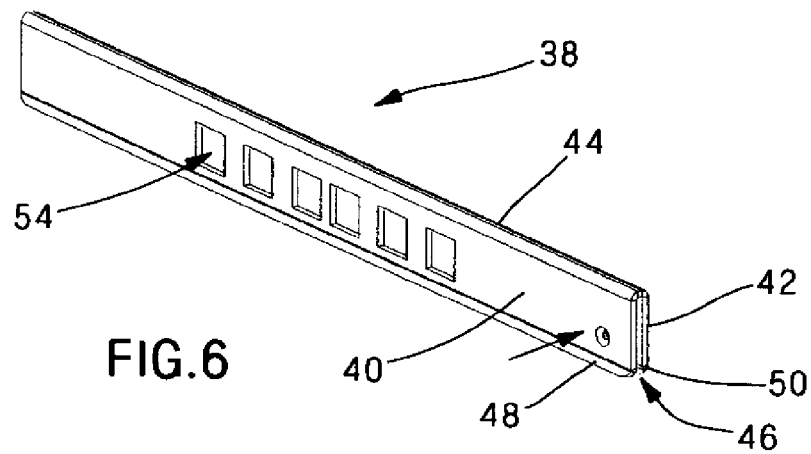
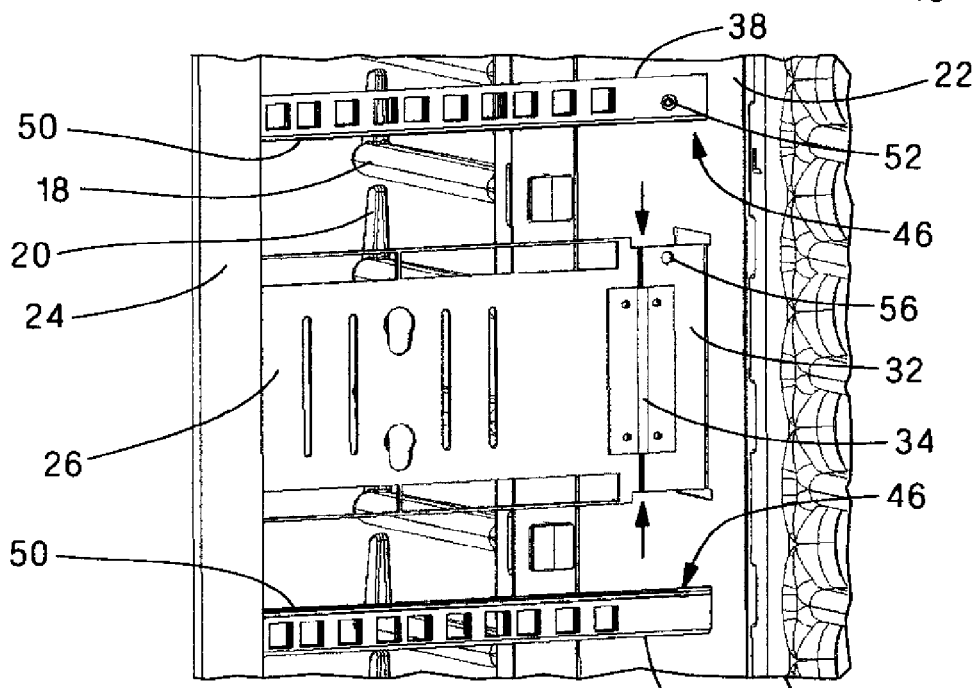
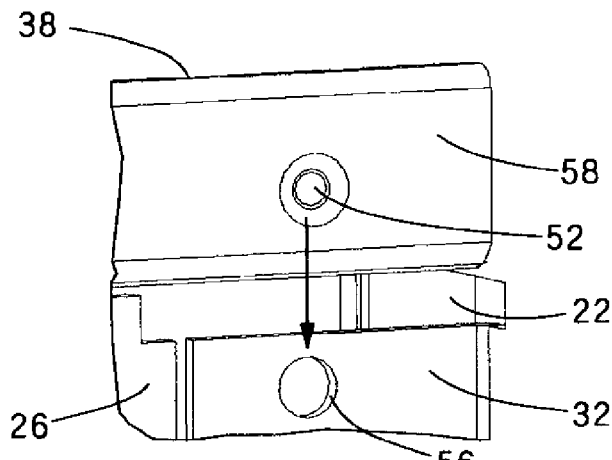

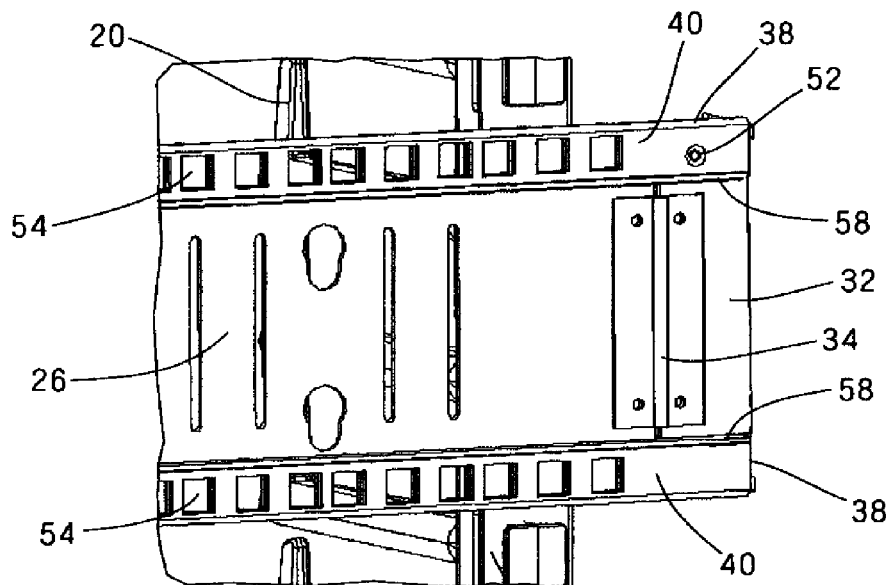
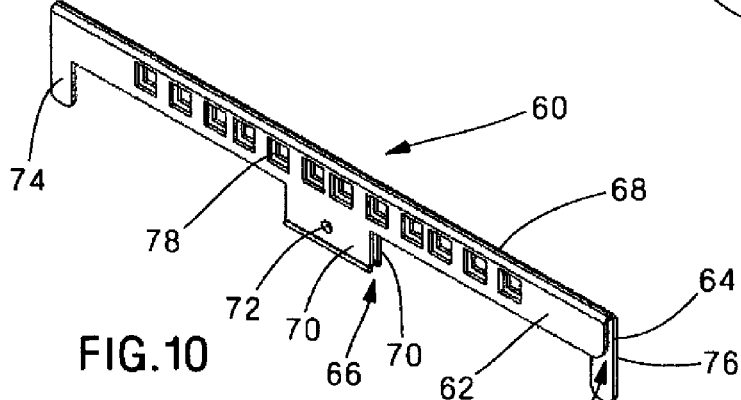
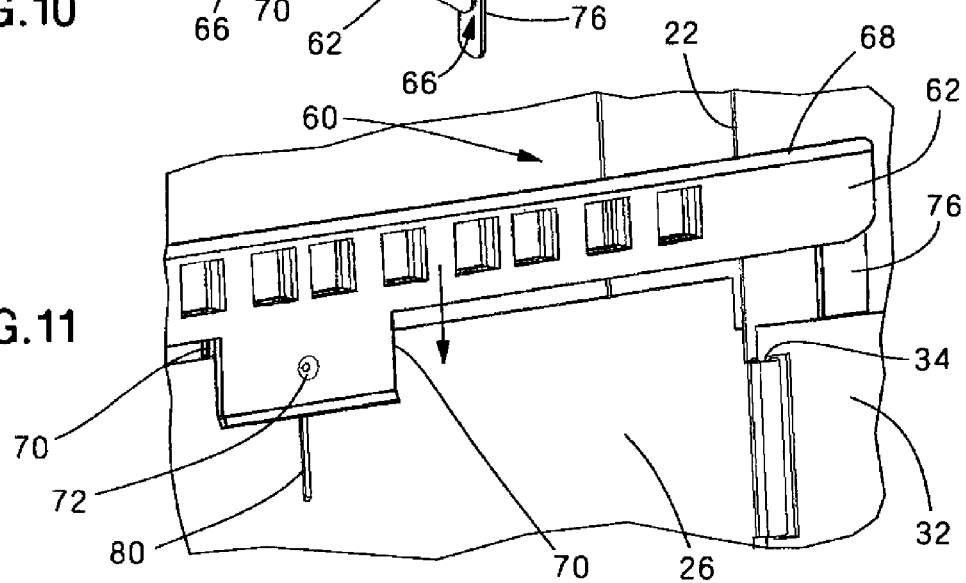

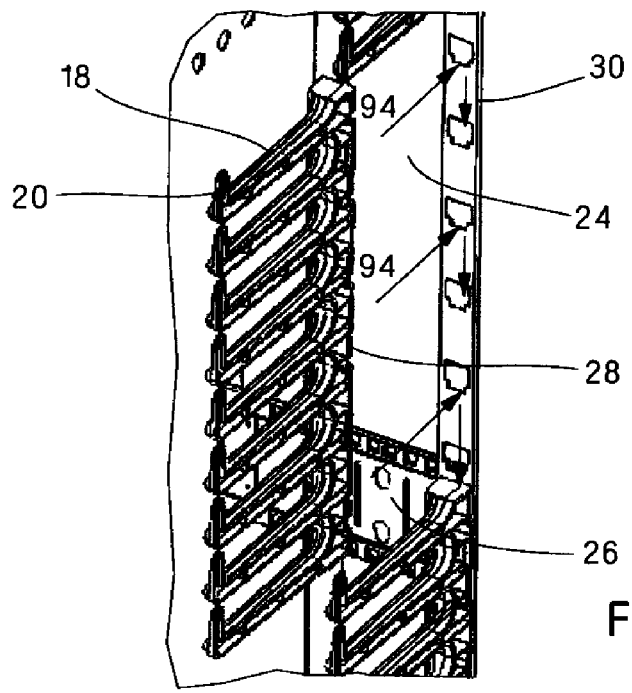
FIG.13
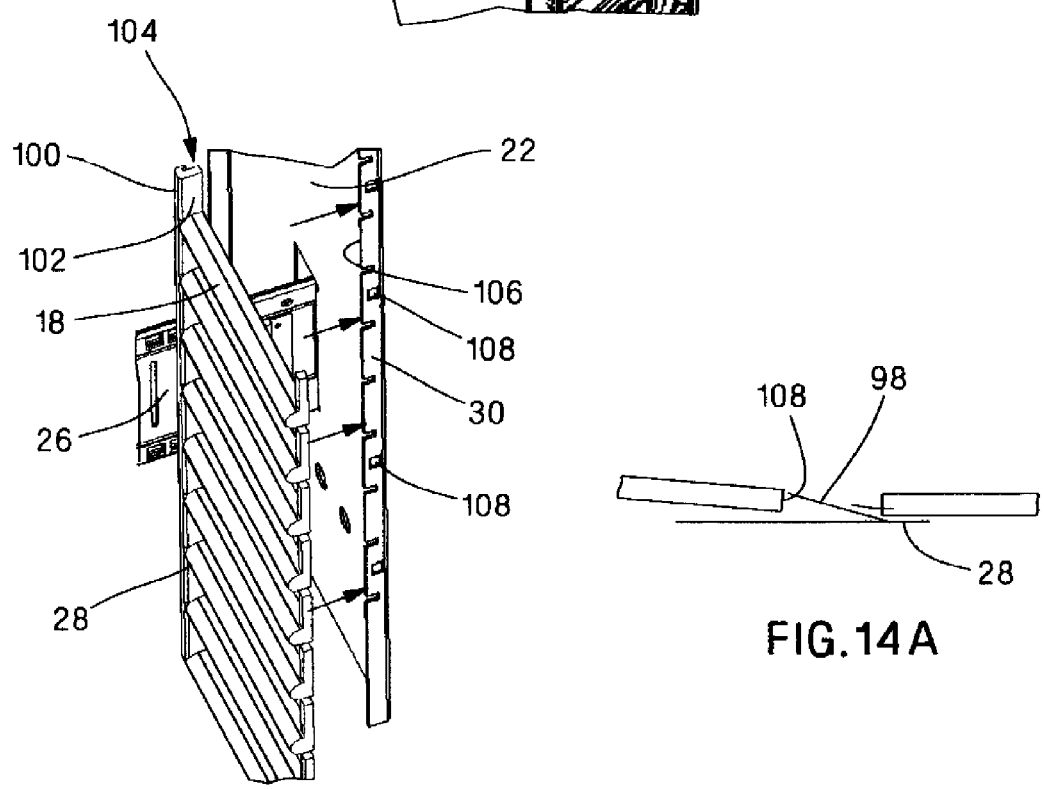
FIG.14
FIG.14A

VERTICAL CABLE MANAGEMENT SYSTEM

CROSS-REFERENCE TO RELATED APPLICATIONS

This application claims priority to U.S. Provisional Application No. 61/147,531, filed Jan. 27, 2009, the subject matter of which is hereby incorporated by reference in its entirety.

FIELD OF THE INVENTION

Generally, this invention relates to cable management devices for communications network equipment racks. In particular, this invention relates to an improved vertical cable manager for managing copper cables and fiber cables.

BACKGROUND

Cable managers are known for routing the wires and cables of electronic equipment, such as telecommunications equipment and computers. These wires and cables include UTP, ScTP, coaxial and fiber optic cables capable of transmitting data, voice, video and/or audio information. Network equipment racks are known to support the electronic equipment and patch panels in a telecommunications system. Cable managers are typically used in association with the equipment racks to receive and route the wires and cables to and from the electronic equipment and patch panels in an organized manner.

Present cable managers are shipped in a fully assembled condition, requiring large packages to be shipped and to be handled upon receipt at an installation. The package including the cable manager includes a substantial volume of empty space between the members forming the cable manager, which increases the shipping cost to transport the volume of empty space.

Additionally, typical cable managers include outwardly projecting fingers adapted to receive and route cables and wires passing between electronic equipment and/or patch panels. In some cable managers, the fingers are fixedly mounted on the cable manager structure, which increases the volume of the cable manager to be shipped, thus increasing shipping costs.

Further, present cable managers are not configured to utilize the cable manager to mount additional EIA-310 standard dimension electronic or other equipment to the cable manager, thus limiting the capacity of the telecommunications system. In typical cable managers, the space between the side panels that support the fingers is underutilized because the cross brace brackets supporting the cable manager are randomly spaced and unable to act as mounting supports for EIA-310 dimensioned equipment.

Also, present cable managers do not define a separate vertical pathway for the small number of fiber cables routed from an enclosure compared to the large number of copper cables routed from the patch field of high density switch applications of a telecommunications system. Separating the paths of the fiber cables and copper cables provides easier handling and feeding of the fiber cables in a path that is not crowded with a large volume of larger copper cables. In addition, the possibility of breaking a fiber cable when manipulating a copper cable or cables in the same path is significantly reduced.

Further, it would be advantageous to provide a cable manager that has an increased capacity to tie down and secure the copper and fiber wires and cables passing through the cable manager. The space between the side panels forming the vertical cable manager is ideally suited to accommodate sufficient strain relief bars to provide tie off locations for the cables and wires.

Also, the electronic equipment that is typically mounted to an equipment rack, such as patch panels and power strips, generate heat, requiring that thermal management for these devices be designed into the cable manager. Proper ventilation ports in the cable manager can assist in allowing air circulation in and out of the cable manager.

SUMMARY OF THE INVENTION

The present invention relates to an improved vertical cable manager for routing and retaining wires and cables attached to electronic equipment.

One embodiment of the cable manager of the present invention provides a flat packaging option, whereby the cable manager can be shipped in a slim, flat configuration to reduce shipping costs, allow ease of handling upon receipt at an installation site, and reduce the amount of waste packaging material generated upon removing the cable manager from its package. In this embodiment, the cross braces between opposed side panels of the cable manager are hinged to the side panels, allowing one side panel to collapse adjacent the other panel for shipping. The invention also includes a unique locking bracket that prevents the cable manager from folding or collapsing once the cable manager is installed by the ultimate user. In another embodiment, a modified locking bracket allows the cable manager and locking bracket to be factory pre-assembled prior to shipping to a customer.

In a further embodiment, the finger segments of the cable manager are removably attached to the cable manager panels by inserting the finger segments into an appropriate keyed slot in a side panel and sliding the finger segments into place. In another embodiment of the cable manager of the present invention, the finger segments wrap around the edges of each side panel and snap-onto the edges. The finger segments include a combination of snap and slotting structures along the back of the finger segments to attach the segments to the sides of the cable manager. The finger segments also have rounded edges to protect cables and wires from sharp metal edges of the manager walls as the cables and wires enter or leave the cable manager.

In another embodiment, the invention comprises a design methodology and construction of a cable manager that includes a plurality of cross brackets mounted onto the cable manager at a predetermined distance apart. Each of the cross brackets includes horizontal linear arrays of square mounting cut-outs adapted to accept cage nuts typically used in racking applications. The cut-outs are spaced horizontally following the EIA-310 standard. The centerline of a bottom row of mounting cut-outs is spaced a specified distance from the centerline of a top row of cut-outs of the cross bracket immediately below.

In a further embodiment, the present invention includes a D-ring slidably and interchangeably mounted on one or more fingers of the cable manager to provide an independent vertical path for the fiber cables of the telecommunications system, compared to the vertical path of the larger quantity of copper cables. The D-ring can be moved along the finger to optional locations to align with fiber cable entry and exit locations. The D-ring is adapted to be mounted to a finger in two positions one hundred eighty degrees apart.

Another embodiment of the cable manager of the present invention comprises an improved vertically mounted strain relief bar that extends outward into the vertical copper and fiber cable channels of the cable manager, providing additional locations in the space through which the cables are routed that are suitable for secure attachment of the wires and cables to the cable manager structures. The EIA-310 vertical spacing between adjacent cross braces allows accessories of varying capacity and types such as patch panels and strain relief bars to be mounted on the cross braces. The presently disclosed strain relief bar assists in securing large bundles of cable and wire to the cross member backbone of the manager, and positions additional cable bundles horizontally further away from the backbone formed by the cross braces. The end user is then able to take full advantage of the open space in the cable manager through multiple tie-down locations, and to segregate different types of cables and wires routed to different locations within the manager.

In a further embodiment of the present invention, the frame members of the cable manager include perforation patterns to permit ventilation of the warm air generated by electronic system components. The invention includes several types of perforation patterns. The perforation allows the fans of the various electronic components to circulate sufficient air to keep the components from overheating. Certain perforation options also provide cable tie-off locations while still allowing ample ventilation.

BRIEF DESCRIPTION OF THE ILLUSTRATED EMBODIMENTS

Certain examples of the present invention are illustrated by the accompanying figures. It should be understood that the figures are not necessarily to scale and that details that are not necessary for an understanding of the invention or that render other details difficult to perceive may be omitted. It should be understood, of course, that the invention is not necessarily limited to the particular examples illustrated herein.

FIG. 6 is a perspective front view of a locking bracket for locking the hinged cable manager of FIG. 2 in its open position;

FIG. 7 is an exploded detail perspective view of a pair of locking brackets about to be assembled on a cross brace of the hinged cable manager of FIG. 2;

FIG. 8 is a detail perspective view of the boss of the locking bracket of FIG. 6, and the corresponding aperture in the hinge portion mounted to a side panel of the cable manager;

FIG. 9 is a detail perspective view of the locking brackets of FIGS. 6 and 7 assembled and locked into place over the top and bottom edges of a cross brace of the cable manager;

FIG. 10 is a detail perspective view of another embodiment of the locking brace of the present invention;

FIG. 11 is a detail perspective assembly view of the locking brace of FIG. 10 mounted on a cross brace, including a tab that limits pivotal movement of the hinged cross brace;

FIG. 13 is a perspective exploded view of an embodiment of the present invention showing a segment of fingers prior to attachment to a keyed slot in a cable manager side panel;

FIG. 14 is a perspective exploded view of another embodiment of the present invention wherein a segment of fingers wraps around the edges of each side of a cable manager panel;

FIG. 14A is a detail view of a barb type snap that is used in one embodiment of the present invention to attach a finger segment to a side panel of the cable manager;

DETAILED DESCRIPTION

Figure 1:
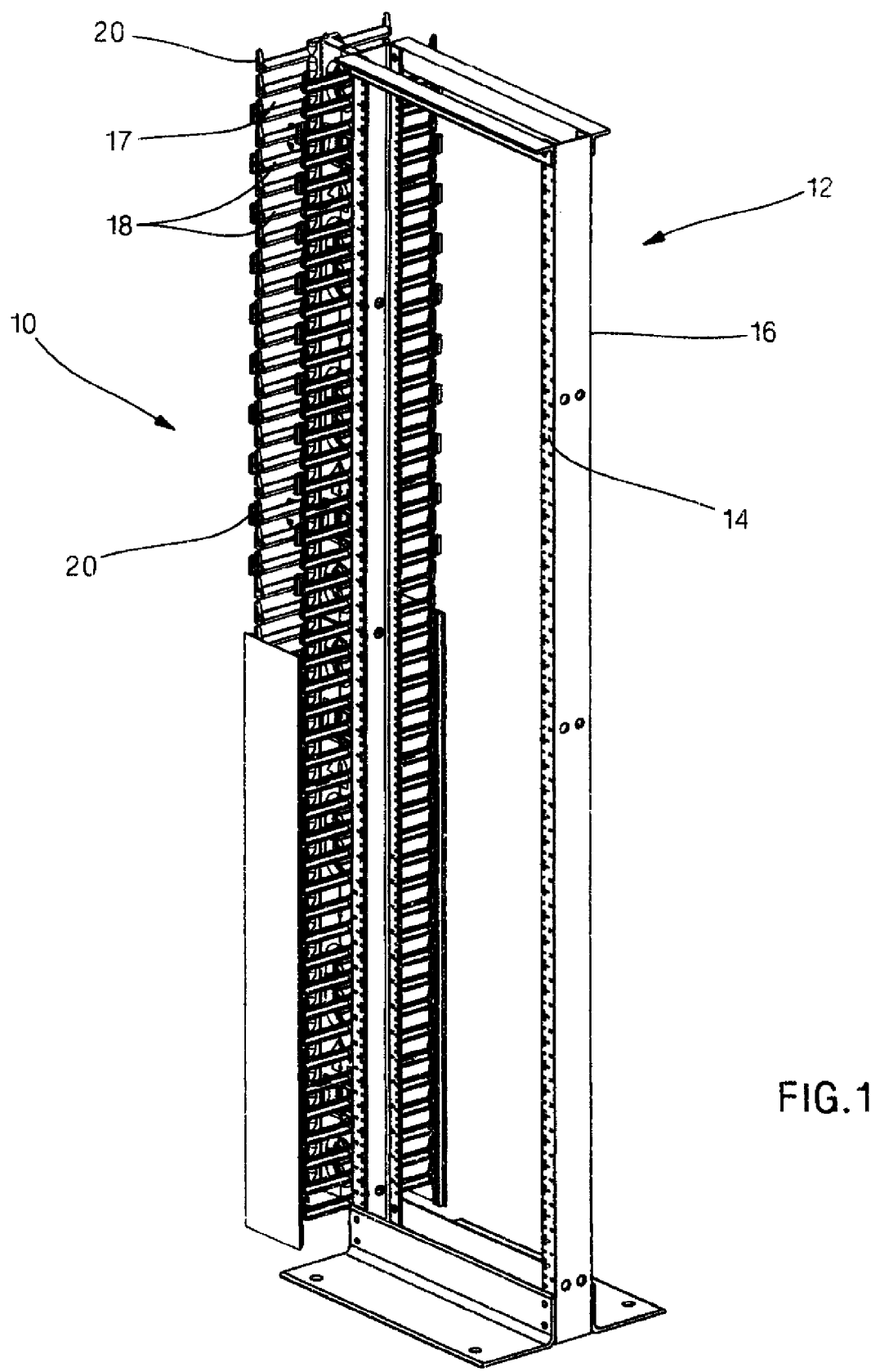
FIG. 1 is a perspective front and side view of a cable manager of the prior art attached to a relay rack used to support or house electronic equipment.

Referring to FIG. 1, an example of a cable manager 10 attached to an electronic component rack 12 is illustrated. The rack 12 includes those that conform to the WECO and EIA standards known to those of skill in the art. Rack 12 comprises a plurality of rack mounting apertures 14 along vertical member 16. Cable manager 10 may be secured to rack 12 through methods known to those skilled in the art. After cable manager 10 has been mounted to rack 12, a plurality of cables 128, 132 (FIG. 22) are routed to and from electronic equipment and patch panels. Cables 128, 132 may be routed through openings 17 found between horizontal projections formed by fingers 18 attached to cable manager 10, as will be explained. Each finger 18 includes a vertically extending tab 20 that assists in retaining cables in the openings 17 formed between fingers 18, and substantially prevents the cables 128, 132 from falling or slipping out of opening 17.

Figure 2:
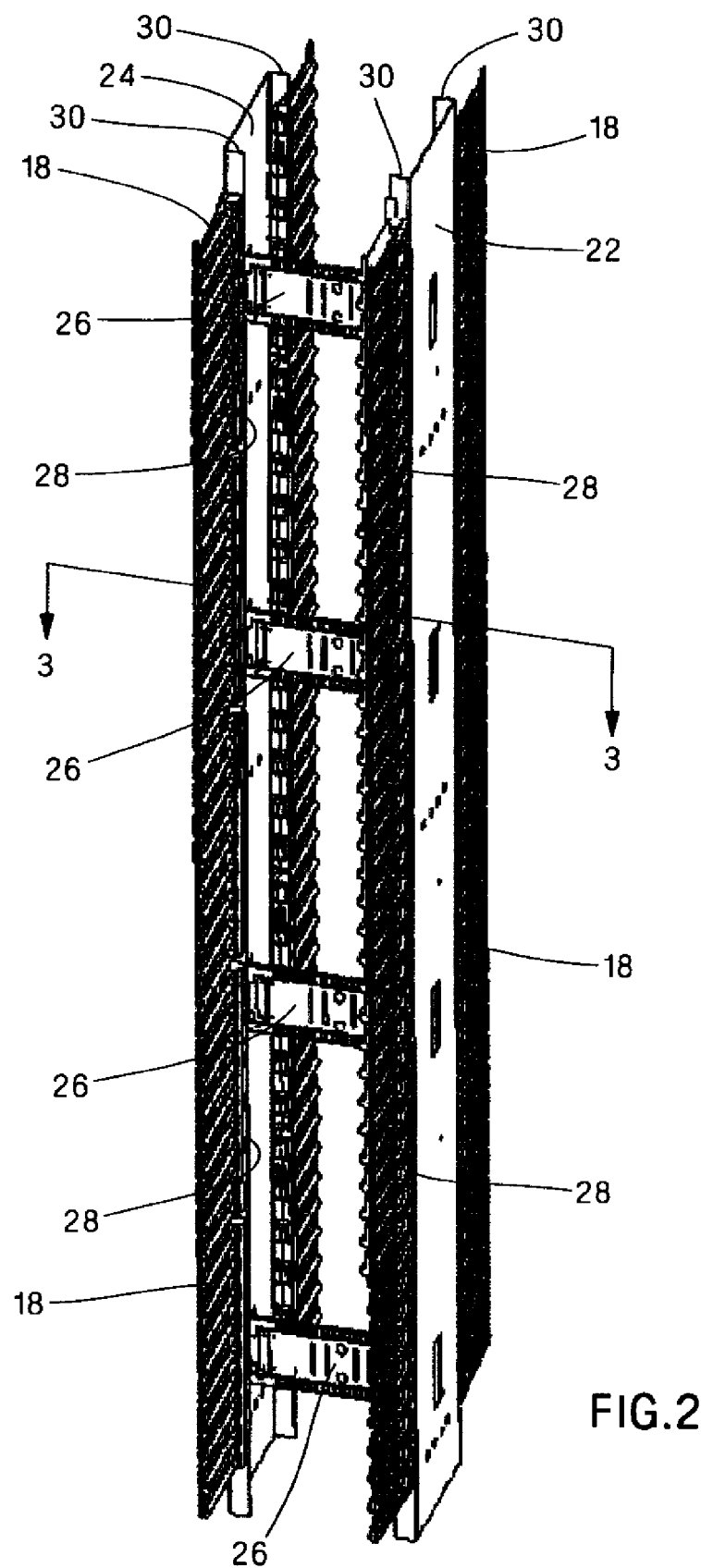
FIG. 2 is a perspective front and side view of a vertical cable manager having hinged cross braces in accordance with one embodiment of the present invention.
Figure 21:
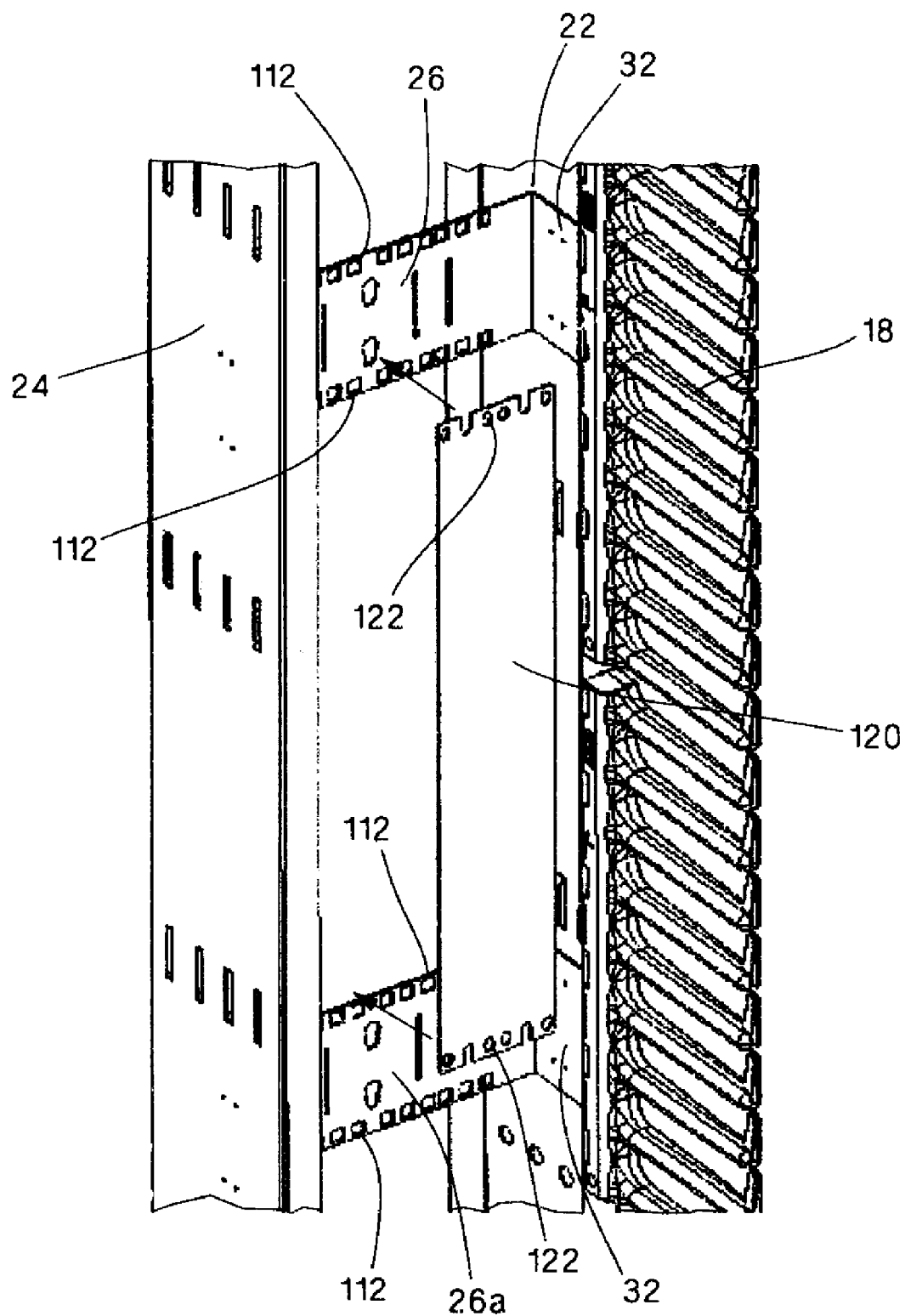
FIG. 21 is a detailed perspective exploded view of the cable manager of FIG. 18, showing a typical component panel just prior to assembly to two adjacent cross brace brackets.
Figure 46:
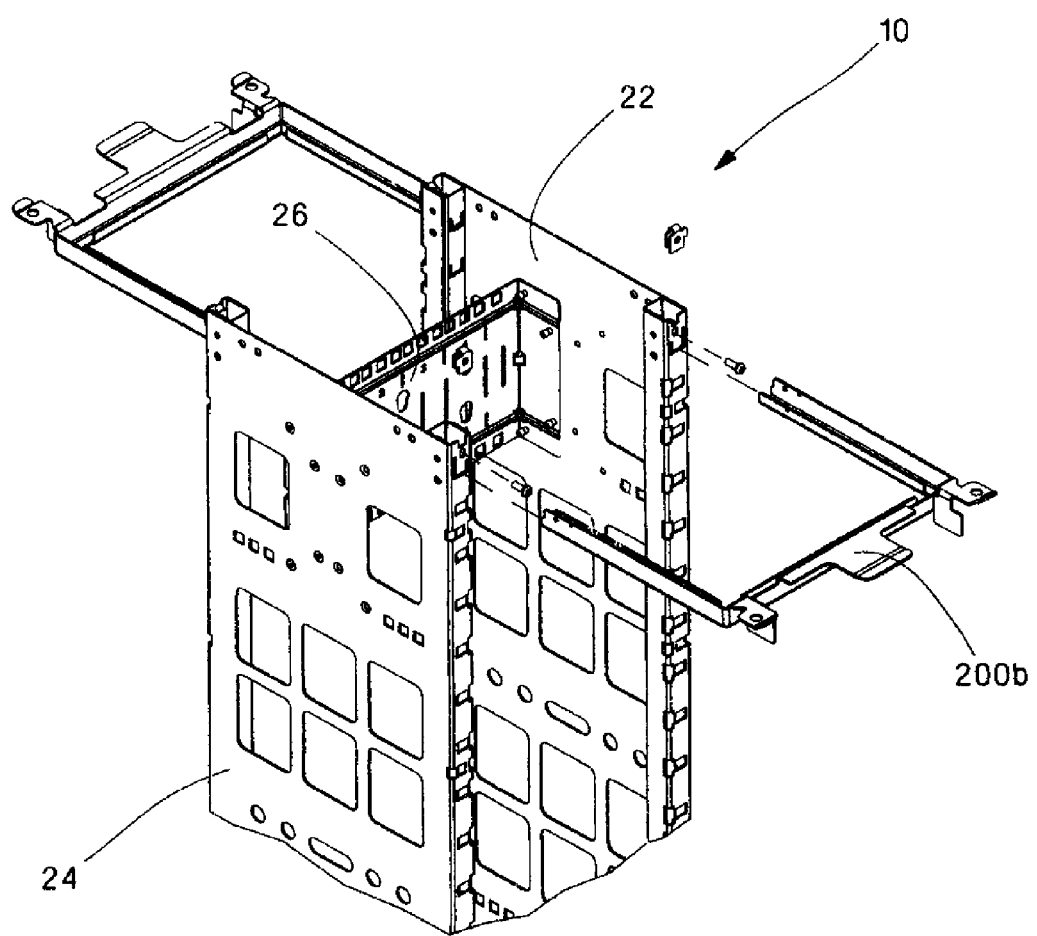
FIG. 46 is a detailed perspective view of the cable manager of FIG. 45, showing installation of the door brackets.

As seen in FIG. 2, cable manager 10 comprises two opposed spread apart vertically extending side panels 22, 24 connected by a plurality of cross brace brackets 26 that, in certain embodiments of the present invention, are pivotally connected to the inner surfaces of each side panel 22, 24, as will be explained in further detail. Alternatively, as seen in FIG. 21 and FIG. 46, cross brace brackets 26 are rigidly connected to side panels 22 and 24. Multiple segments 28 of outwardly protruding fingers 18 are attached to opposite side flanges 30 of each side panel 22, 24.

Figure 3:
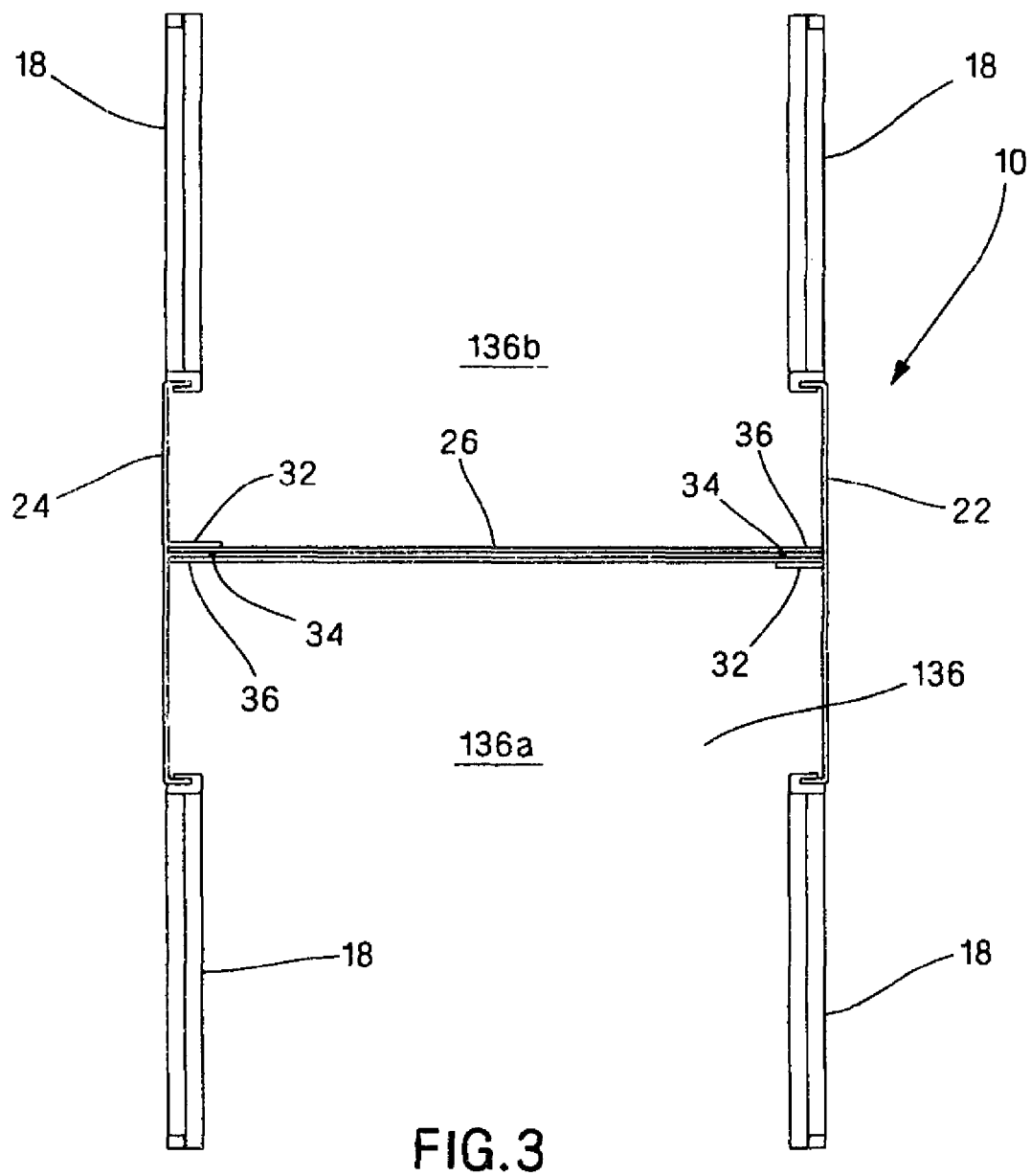
FIG. 3 is a top section view of the cable manager of FIG. 2, taken along line 3-3 in FIG. 2, showing the cable manager fully opened.

FIG. 3 illustrates, in cross section, the cable manager 10 in its fully open position. Each side panel 22 includes a laterally extending mounting bracket 32 having a pivot point 34 mounted to each bracket 32. Cross brace bracket 26 is pivotally attached near, but not at both ends to, each mounting bracket 32 at pivot points 34, for purposes to be explained. The axes of pivot points 34 are offset from the sides 22, 24 of cable manager 10.

Figure 4:
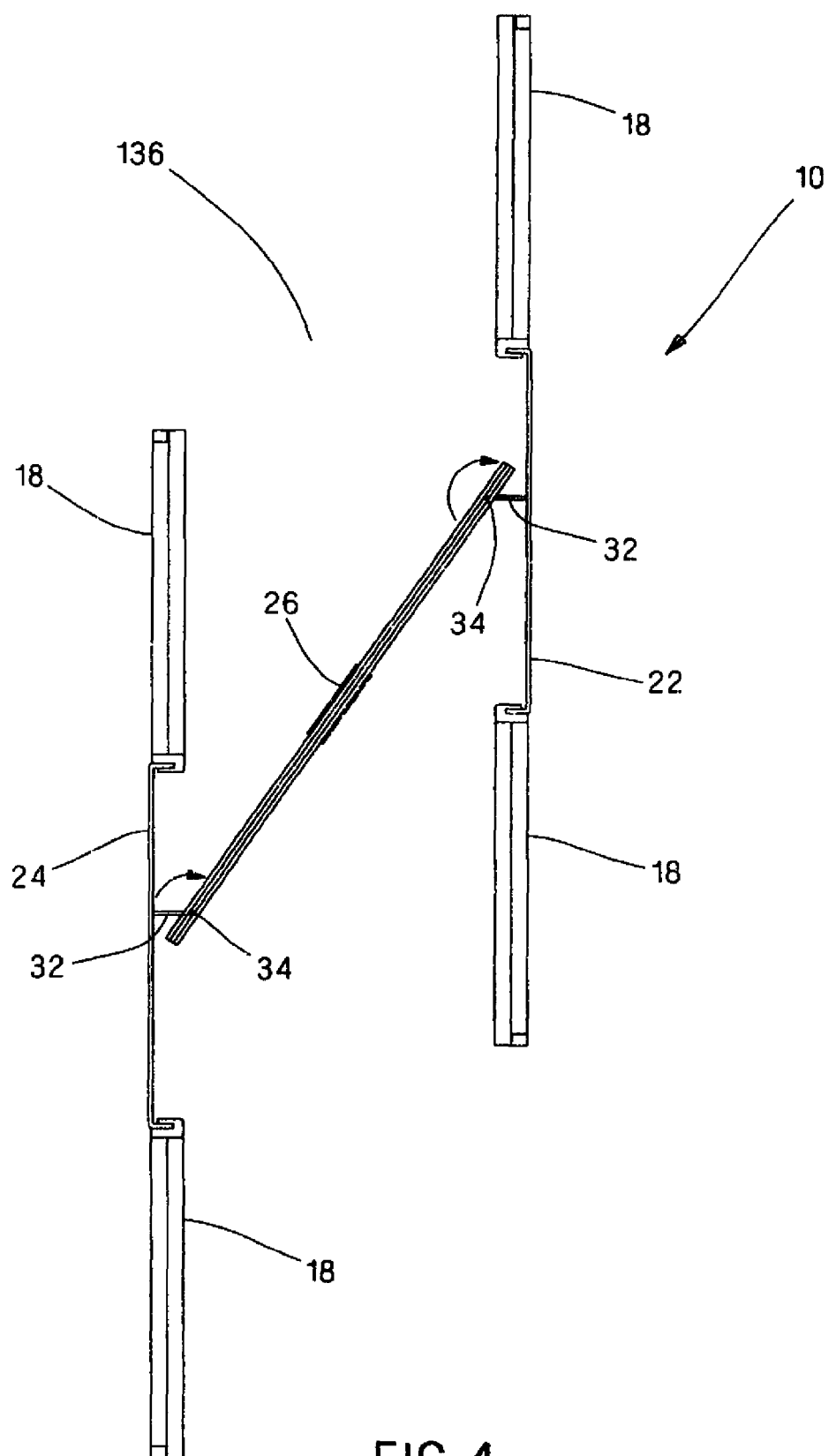
FIG. 4 is a top section view of the cable manager of FIGS. 2 and 3, showing the side panels of the cable manager in a partially collapsed position, and the cross brace bracket partially rotated relative to each side panel of the manager.
Figure 5:
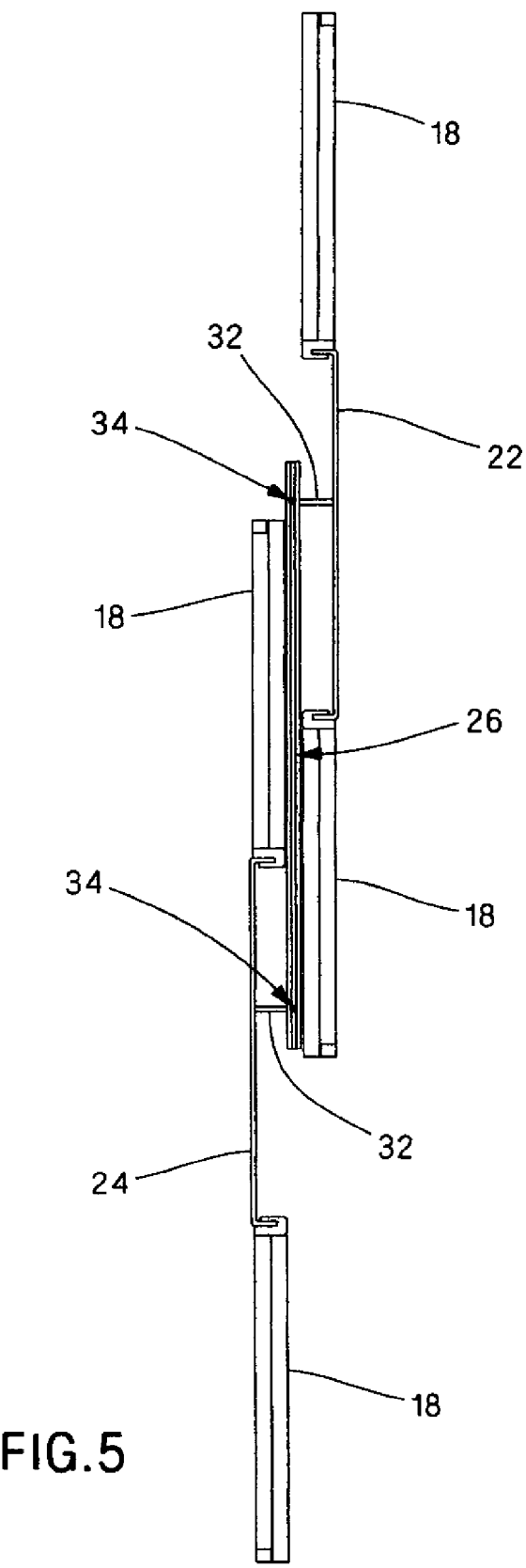
FIG. 5 is a top section view of the cable manager of FIGS. 2, 3 and 4, showing the cross brace member fully pivoted relative to the side panels of the cable manager, and the side panel in a fully collapsed position.

FIG. 4 shows the cable manager 10 in a partially folded position. As side panel 22 is moved towards side panel 24, cross brace bracket 26 rotates about pivot points 34, until the cable manager 10 reaches its fully folded position, as shown in FIG. 5. In its folded position, the cable manager 10 has a substantially flat profile, with the side panels 22, 24 and the fingers 18 remaining parallel to each other. In the folded position, the cable manager 10 will contact the cross brace brackets 26 along the length of the cross brace brackets, as seen in FIG. 5.

When an end user receives the cable manger 10 in its folded configuration, the user unfolds the cable manager to its open position as shown in FIG. 3. The ends of each cross brace bracket 26 have an overhang portion 36 that extends outward beyond pivot point 34. As seen in FIG. 3, in the fully open position of cable manager 10, each overhang portion 36 abuts the laterally extending surface of adjacent mounting bracket 32, thus preventing further rotation of each cross brace bracket 26 beyond ninety degrees from the plane of the side panels 22, 24, such that cross brace member 26 is perpendicular with each side panel 22, 24 and fingers 18.

The foldability of the cable manager 10, as described above, enables the cable manager to be shipped to an end user in a flat package that provides the advantages of reducing shipping costs by increasing the number of managers shipped on a pallet, eliminating waste from excess packaging materials, and improving handling at the customer's location.

When the end user opens the cable manager package and opens the cable manager to the position shown in FIG. 3, the cable manager needs to be locked into place. The locking bracket 38 shown in FIG. 6 is adapted for this purpose. The embodiment of locking bracket 38 shown in FIG. 6 includes two spaced apart parallel panels 40, 42 joined at one end 44 in a curved configuration, and providing an open slot 46 at the other end 48. Flanges 50 provide a lead in feature to slot 46 for purposes to be explained. A locking detent or boss 52 is formed in one or both panels 40, 42, with the interior of detent or detents 52 extending into slot 46. The locking bracket 38 also includes a plurality of rectangular cutouts 54 that conform to EIA-310 panel mount standards.

Referring to FIGS. 7, 8 and 9, the installation of a pair of locking brackets 38 to cross brace bracket 26 is illustrated. As shown in FIG. 7, one locking bracket 38 mounts cross brace bracket 26 from the top, and a second locking bracket 38 mounts from the bottom. The open slot 46 of each locking bracket 38 is guided into place over the upper and lower edges of cross brace bracket 26 by means of the guiding feature provided by flanges 50. The locking brackets 38 advance over bracket 26 until the outer edges of cross brace bracket 26 reach the bottom of open slot 46, and detent or detents 52 lodge in aperture 56 of mounting bracket 32, locking the cable manager 10 in its open position without the use of tools.

As seen in FIG. 8, a portion 58 of locking bracket 38 extends over an edge of mounting bracket 32, which is also encased by open slot 46 as each locking bracket 38 is installed over both cross brace bracket 26 and mounting bracket 32. When installed as described, locking bracket 38, with portion 58, prevents pivotal movement of cross brace bracket 26 relative to mounting bracket 32 and side panels 22, 24, thus maintaining cable manager 10 in its open position, as seen in FIG. 9, and providing rigidity to the cable manager 10.

A further embodiment of the locking bracket of the present invention enables the modified locking bracket to be factory pre-assembled onto a cable manager 10. Referring to FIGS. 10 and 11, the modified locking bracket 60 includes two parallel panels 62, 64, defining a slot 66 between the panels. The panels 62, 64 are joined together at one end 68 of bracket 60. Locating tabs 70 extend outward from panels 62, 64, defining an extension of slot 66 between locating tabs 70. A detent or boss 72 is formed on one or both locating tabs 70, and the detent or detents extend into slot 66 between the two locating tabs 70. A stop tab 74 extends outward from one lateral end of panel 62, and a second stop tab 76 extends outward from panel 64 at the end of modified locking bracket 60 opposite locking tab 74. Cutouts 78 conforming to EIA-310 panel mount standards also extend through panels 62 and 64.

Referring to FIG. 11, a guiding slot 80 is formed in cross brace bracket 26. As modified locking bracket 60 is moved over the upper edge of cross brace bracket 26, the edge of the cross brace bracket enters slot 66 between locating tabs 70. Simultaneously, detent 72 advances along guiding slot 80, and the bottom portion of stop tabs 74, 76 become lodged against an upper portion of mounting brackets 32 attached to side panels 22, 24 of cable manager 10. FIG. 11 shows modified locking bracket 60 after an edge of cross brace bracket 26 has been lodged in slot 66 between locating tabs 70, but before modified locking bracket 60 has been fully installed over cross brace bracket 26. In this position, the locating tabs 70, with the aid of detent 72, guiding slot 80 and friction, hold the modified locking bracket in the position shown in FIG. 11 during shipping of cable manager 10 in its folded position. (FIG. 5). Upon receipt by the end user, the cable manager 10 is opened (FIG. 3) and the modified locking bracket 60 is advanced further until cross brace bracket 26 is lodged in slot 66. Simultaneously, locking tabs 74 and 76 will engage mounting bracket 32 to prevent the manager from rotation beyond ninety degrees from the folded position of cross brace bracket 26.

Figure 12A:
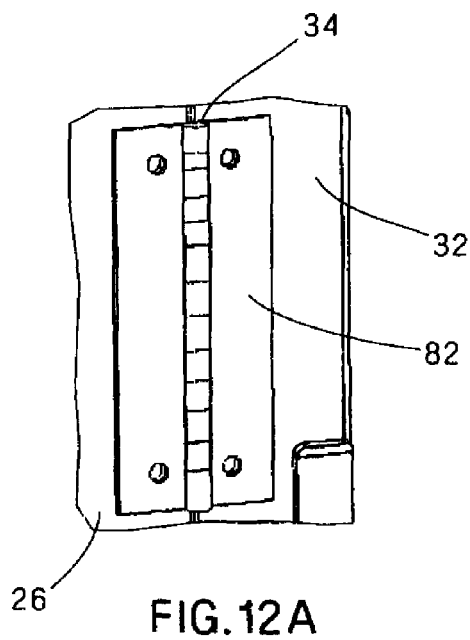
FIGS. 12A, 12B and 12C are detail perspective views of several types of hinges used to pivotally attach the cross braces to the side panels of the cable manager of the present invention.
Figure 12B:
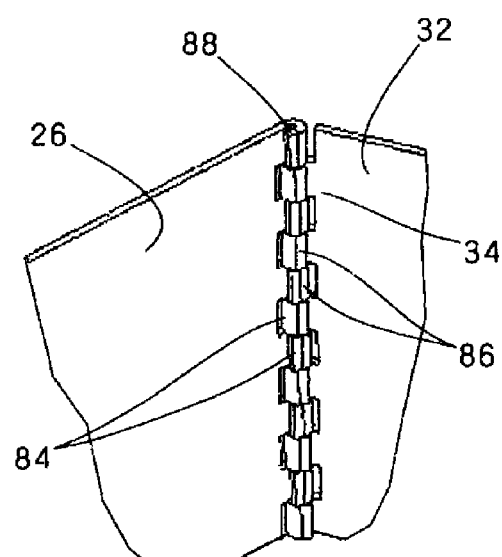
Figure 12C:
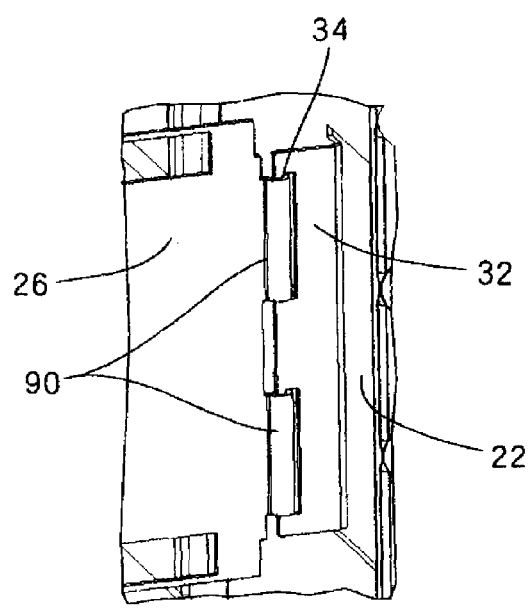

FIGS. 12A, 12B and 12C illustrate several types of hinge devices that provide the pivot point 34 between mounting bracket 32 and cross brace bracket 26. The hinging for cable manager 10 can be accompanied with commercially available hinges that can be attached with commonly known assembly methods, such as rivets, welds, screws, adhesives or other fasteners. FIG. 12A illustrates a commercially available hinge 82 pivotally connecting mounting bracket 32 and cross brace bracket 26. In FIG. 12B, the hinge 84 comprises integral hinge knuckles 86 formed into mounting bracket 32 and cross brace bracket 26. Pin 88 is inserted between the knuckles 86 to keep the hinges together and provide pivot point 34. FIG. 12C discloses a hinge 90 integrally formed as part of cross brace bracket 26. Hinge 90 is partially open, and extends through a slot in mounting bracket 32. The hinge 90 of FIG. 12C does not use pins or extra fasteners. Other variations of hinging methods and structures as are known in the art could be employed in the construction of cable manager 10.

The cable manager 10 of the present invention comprises various embodiments of structure for attaching the segments 28 of fingers 18 to the side flanges 30 of cable manager side panels 22, 24. Referring to FIG. 13, both side flanges 30 of side panel 24 include a plurality of keyed slots 94 aligned along the length of each flange 30. The segment 28 to which a plurality of fingers 18 are attached, includes a plurality of snap elements that are adapted to be inserted into keyed slots 94 and slid downward into place to properly mount segment 28 to a corresponding side flange 30.

FIG. 14A illustrates another fastening embodiment, wherein a barb snap 98 on segment 28 is urged into keyed slot 108.

A further embodiment of fastening finger segments 28 to side flanges 30 of cable manager 10 is shown in FIG. 14, where a segment 28 includes a beam 100 having an outer surface 102 to which a plurality of fingers 18 are rigidly attached. Beam 100 also incorporates a slot 104 adapted to frictionally receive and hold the edge 106 of a corresponding side flange 30. In the embodiment of FIG. 14, the beam 28 also includes a plurality of snap elements 98 adapted to be inserted into slots 108 formed in side flanges 30. As the slot 104 of each beam 100 engages and receives the edge 106 of side flange 30, the snap elements 98 snap into slots 108 when the beam 100 reaches its fully installed position.

Figure 15:
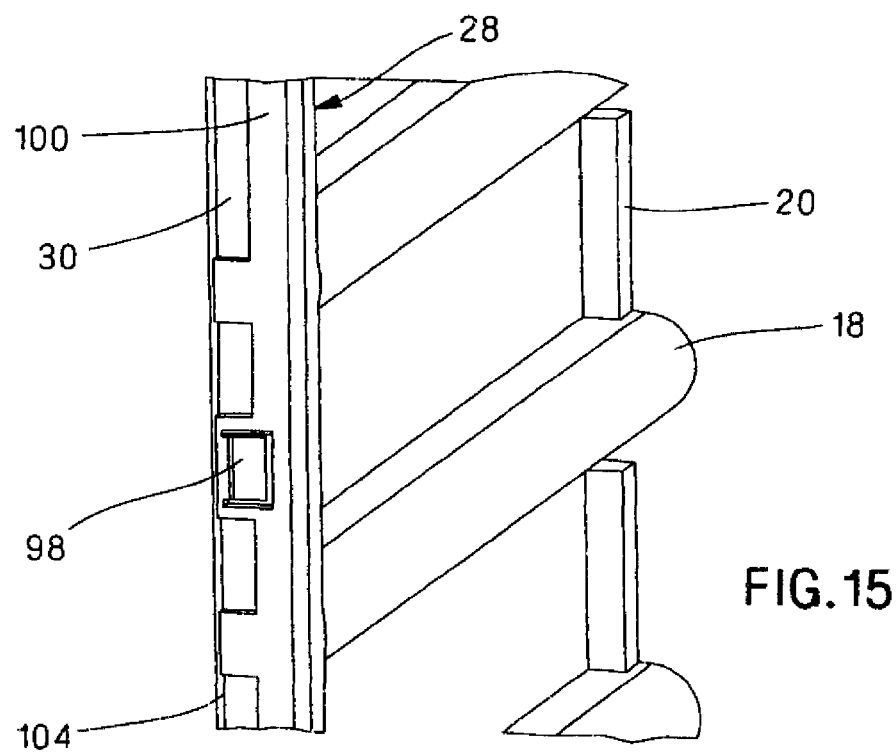
FIG. 15 is a detail perspective view of an embodiment of the present invention utilizing a combination of snap and slotted attachment configurations to attach the finger segments to a side panel of the cable manager.
Figure 16:
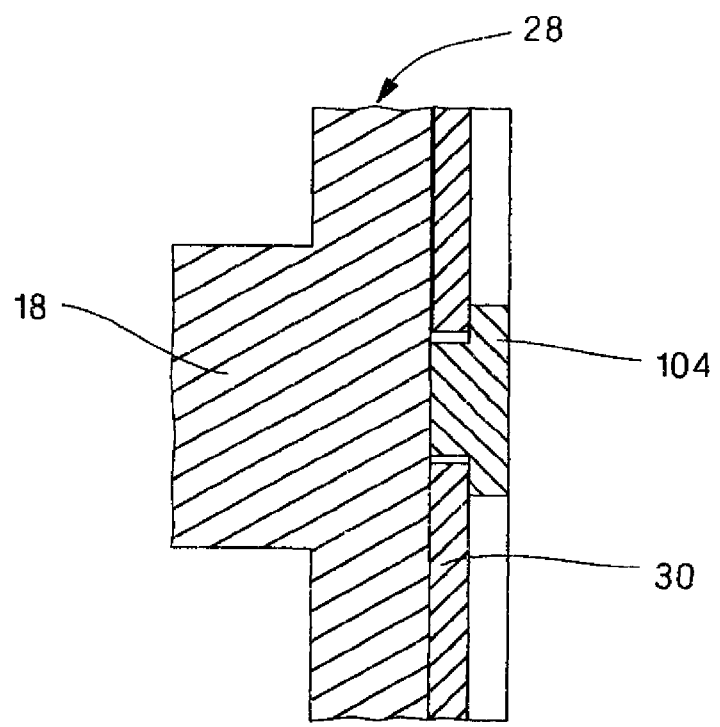
FIG. 16 is a detail cross-section view of a finger section inserted into the side of the cable manager.

Referring to FIG. 15, a combination of T-rib and slotting features along beam 100 of finger segment 28 firmly attach as finger segments 28 to the side flanges 30 of side panels 22, 24. The snap feature helps attach the finger segments 28 on the cable manager 10 by eliminating separate fasteners, improving assembly time, and reducing materials costs. The T-rib 104 along the back of the finger segment beam 100 adds strength and rigidity to segment 28, and helps locate the finger segments 28 during assembly of the cable manager 10.

Figure 17:
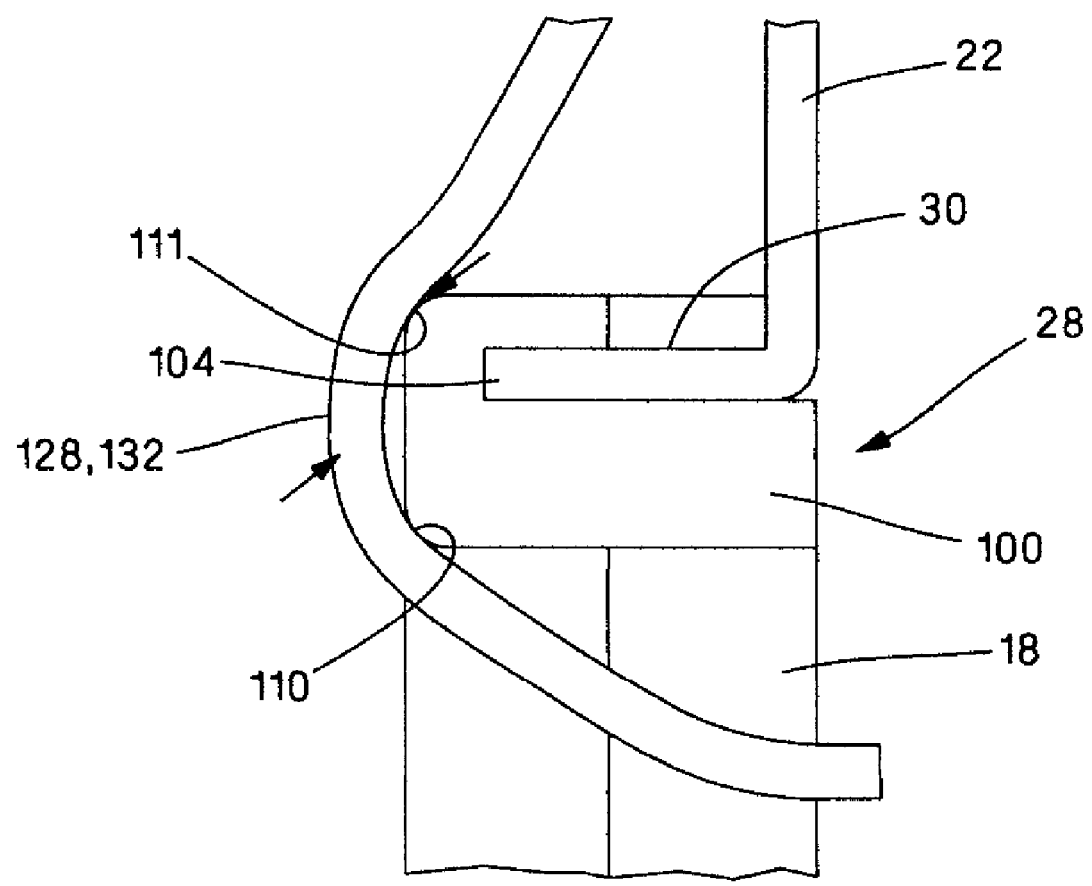
FIG. 17 is a detail cross-section view of a finger attached to a sidewall of the cable manager, showing a cable routed over the rounded edge of the slotted finger segment attachment flange.

Referring to FIG. 17, the outer configuration of the slotted portion of beam 100 has rounded corners 110, 111 to protect cable 128, 132 from abutting sharp metal edges of side flanges 30 as cable 128, 132 enters or leaves the cable manager 10.

Figure 18:
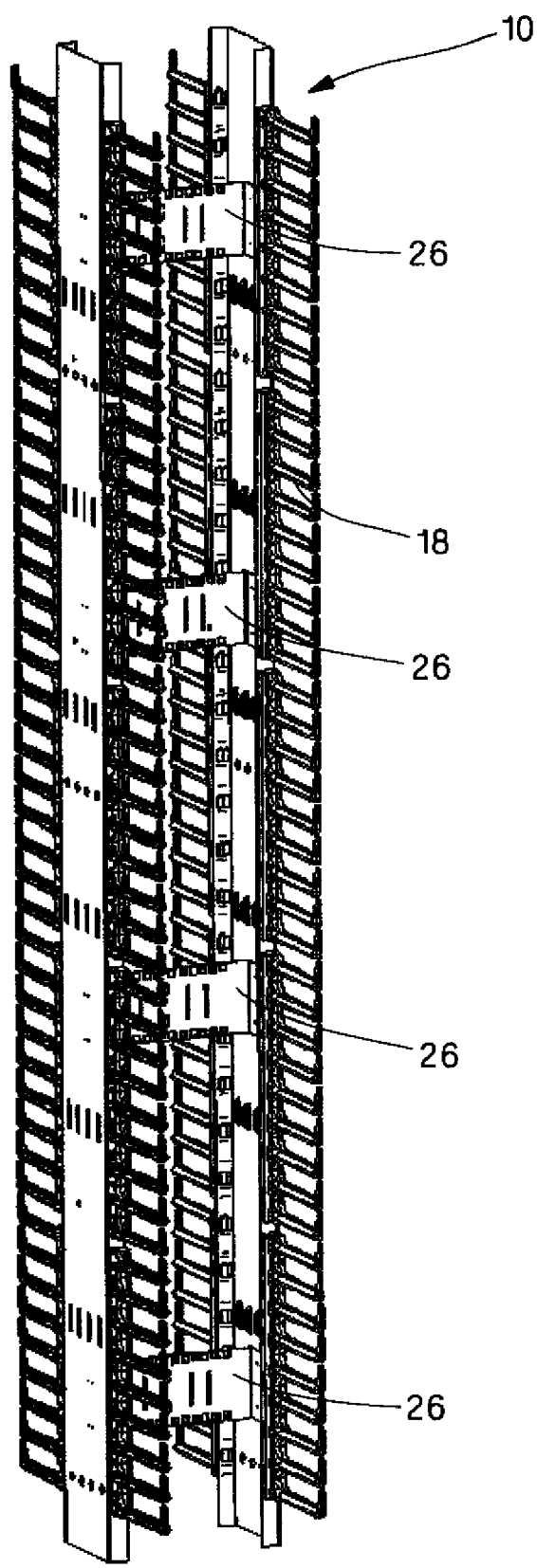
FIG. 18 is a front perspective view of an assembled hinged cross brace cable manager with finger segment attached, showing the cross brace brackets spread apart a predetermined distance to enable standard EIA-310 accessory components to be mounted to the cable manager.

The embodiment of the invention shown in FIG. 18 provides a vertical cable manager 10 with the ability to mount and support a variety of EIA-310 accessory components such as Quick Net patch panels, copper and fiber patch panels, blanking panels for thermal management, D-rings and slack spools, power distribution units, cable management accessories, and the like. This is accomplished by the unique configuration of the cross brace bracket 26 shown in FIG. 19, and a specific spacing between adjacent cross brace brackets 26 attached to side panels 22, 24.

Figure 19:
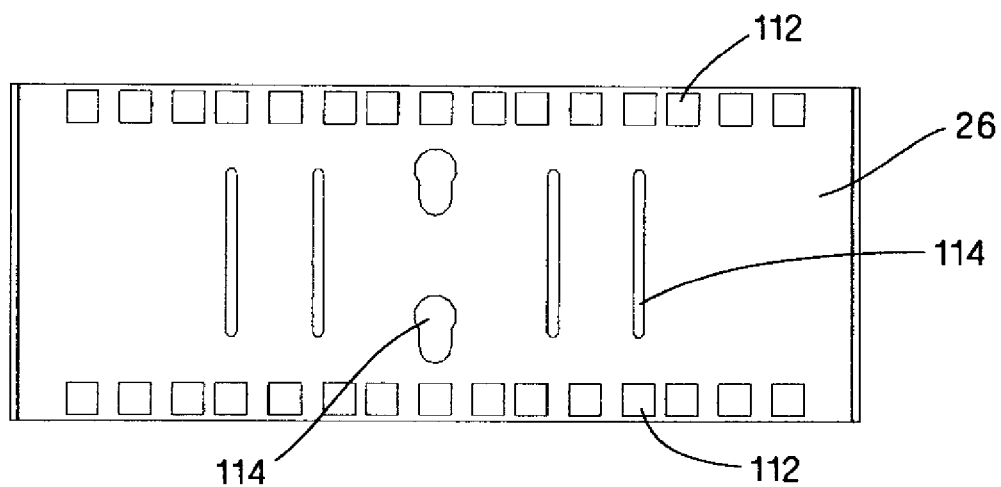
FIG. 19 is a plan view of a cross brace member of an embodiment of the cable manager of the present invention.

Cross brace bracket 26 of FIG. 19 includes a plurality of horizontally linearly aligned rectangular cutouts 112 adjacent the top and bottom edges of the bracket 26. The rectangular cutouts 112 are adapted to accept cage nuts currently used in rack equipment, as is known in the art, enabling the end user to use standard English or Metric fasteners. The horizontal spacing between cutouts 112 follows the EIA-310 standard, utilizing the universal mounting pattern layout. For example, a ten inch wide cable manager could accept up to five 1RU panels, six inch wide managers could accept up to three 1RU panels, eight inch wide managers up to four 1RU panels, and twelve inch wide managers up to six 1RU panels. The cross brace bracket 26 of FIG. 19 also includes additional apertures 114 of varying shape to mount a slack management spool, or to provide cable tie down locations.

Figure 20:
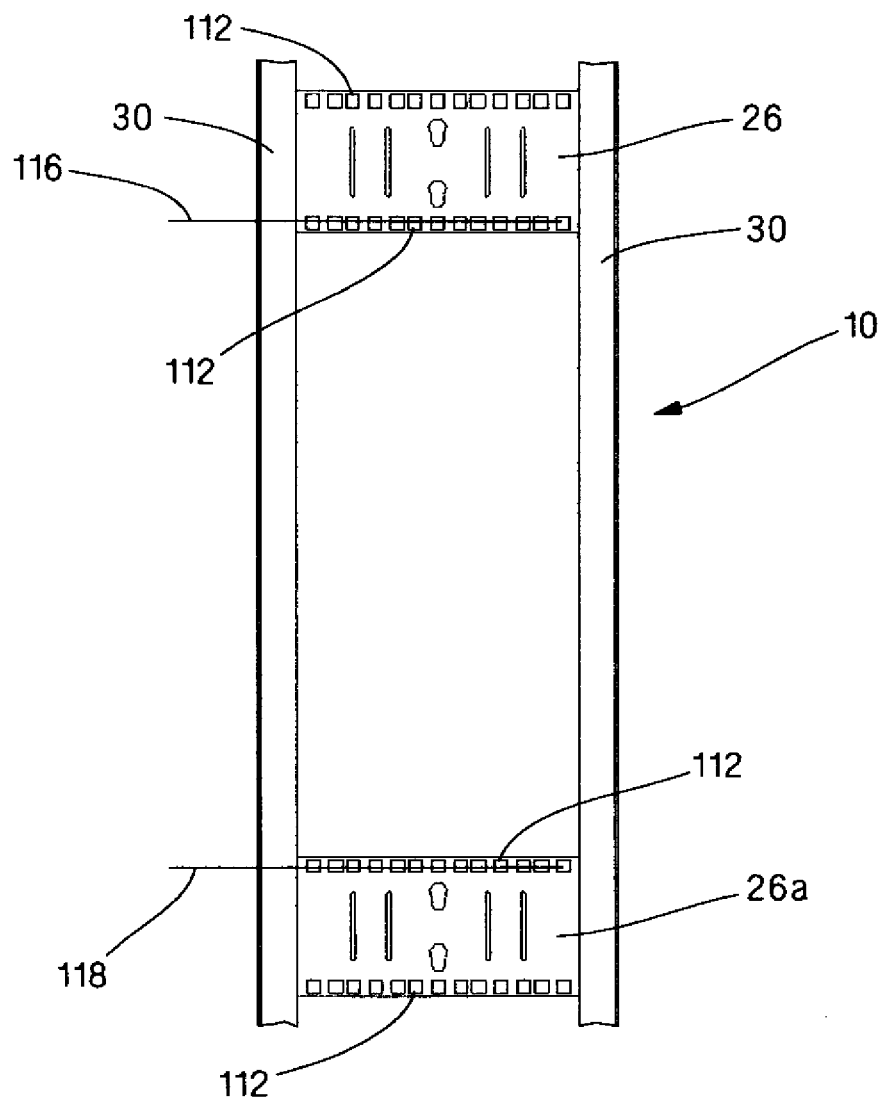
FIG. 20 is a detail elevation view of the cable manager of FIG. 18, showing the distance between rows of square cutouts in adjacent cross brace brackets.

As seen in the embodiment of FIG. 20, when the cross brace brackets are assembled onto vertical cable manager 10, the centerline 116 of the bottom row of mounting cutouts 112 of the upper cross brace bracket 26 is spaced 18.31 inches away from the centerline 118 of the top row of cutouts 112 of the cross brace bracket 26A immediately below the upper cross brace bracket 26. This distance between centerlines 116 and 118 follows the EIA-310 standard for nineteen inch rack equipment.

FIG. 21 shows how a panel 120 of an electronic component would be installed to brackets 26, 26A of the cable manager 10 of FIG. 20. The centerline distance between the upper and lower mounting apertures 122 of panel 120 is 18.31 inches, in accordance with EIA-310 standards. The panel 120 can be easily mounted to cross brace brackets 26, 26a by inserting suitable fasteners, not shown, through apertures 122 and cutouts 112, which are aligned.

Another embodiment of the present invention comprises several embodiments of D-ring configurations that provide separate vertical cable paths for different types of cables, such as between copper patch cables and fiber patch cables for example.

Figure 22:
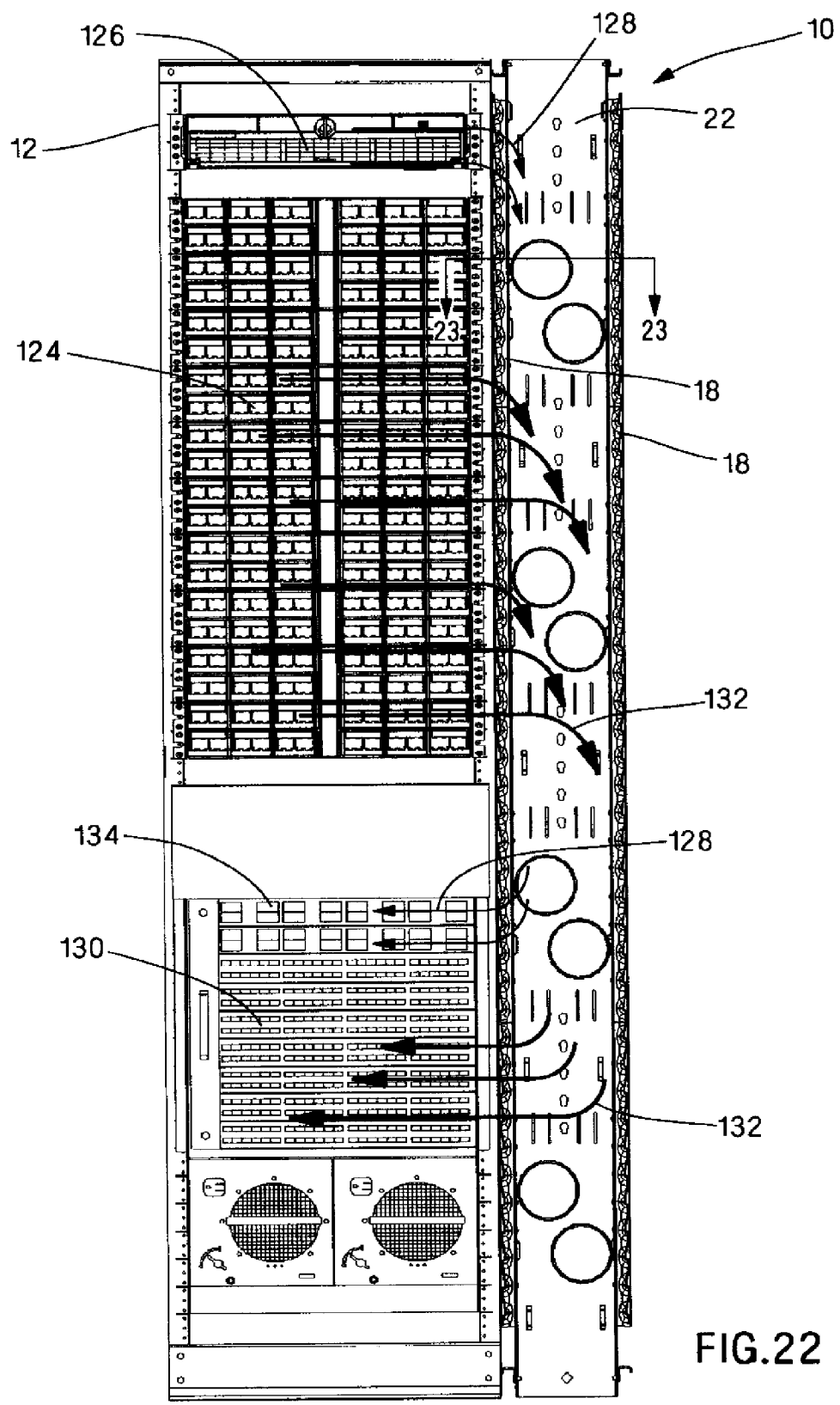
FIG. 22 is a front elevation view of an embodiment of the present invention having a typical component rack with the vertical cable manager of the present invitation attached adjacent to the component rack, and showing the routing path of wires and fiber cables between components mounted on the racks.

FIG. 22 illustrates the front view of a typical network switch application with vertical cable manager 10 attached to component rack 12. The rack in the illustration of FIG. 22 mounts a patch field 124, an enclosure area 126 from which fiber cables 128 extend, several switch units 130 adapted to be electrically connected to copper cables 132, and several switch units 134 adapted to be electronically connected to fiber cables 128.

As schematically illustrated in FIG. 22, copper cables 132 extend horizontally from patch field 124, across openings 17 between adjacent fingers 18 of cable manager 10, and then extend vertically in the volume 136 (FIG. 23) existing between side panels 22 and 24 of cable manager 10. In similar fashion, fiber cables 128 extend horizontally from enclosure area 126, through openings 17 of adjacent fingers 18 of cable manager 10, and then extend vertically downward in volume 136.

As copper cables 132 approach the bottom of cable manager 10, the cables 132 extend horizontally away from volume 136, through adjacent spaces 17 between fingers 18 and away from cable manager 10. The copper cables 132 are then connected to an appropriate switch unit 130. As fiber cables 128 approach the bottom of cable manager 10, the fiber cables 128 extend horizontally away from volume 136, through adjacent spaces between fingers 18 and away from cable manager 10. Each fiber cable is then connected to an appropriate fiber port in switch unit 134.

In typical installations of the type described, a large number of copper cables 132 extend from patch field 124, through volume 136 of cable manager 10, and to copper ports on a switch unit 130. In contrast, in typical units, only a small number of fiber cables extend from enclosure 126, through volume 136 of cable manager 10, and to fiber ports on switch units 134. It has been found to be desirable to separate the small quantity of fiber cables 128 from the larger bundle of copper cables 132 as the cables extend vertically in volume 136 of cable manager 10 by defining a dedicated fiber cable pathway.

Figure 23:
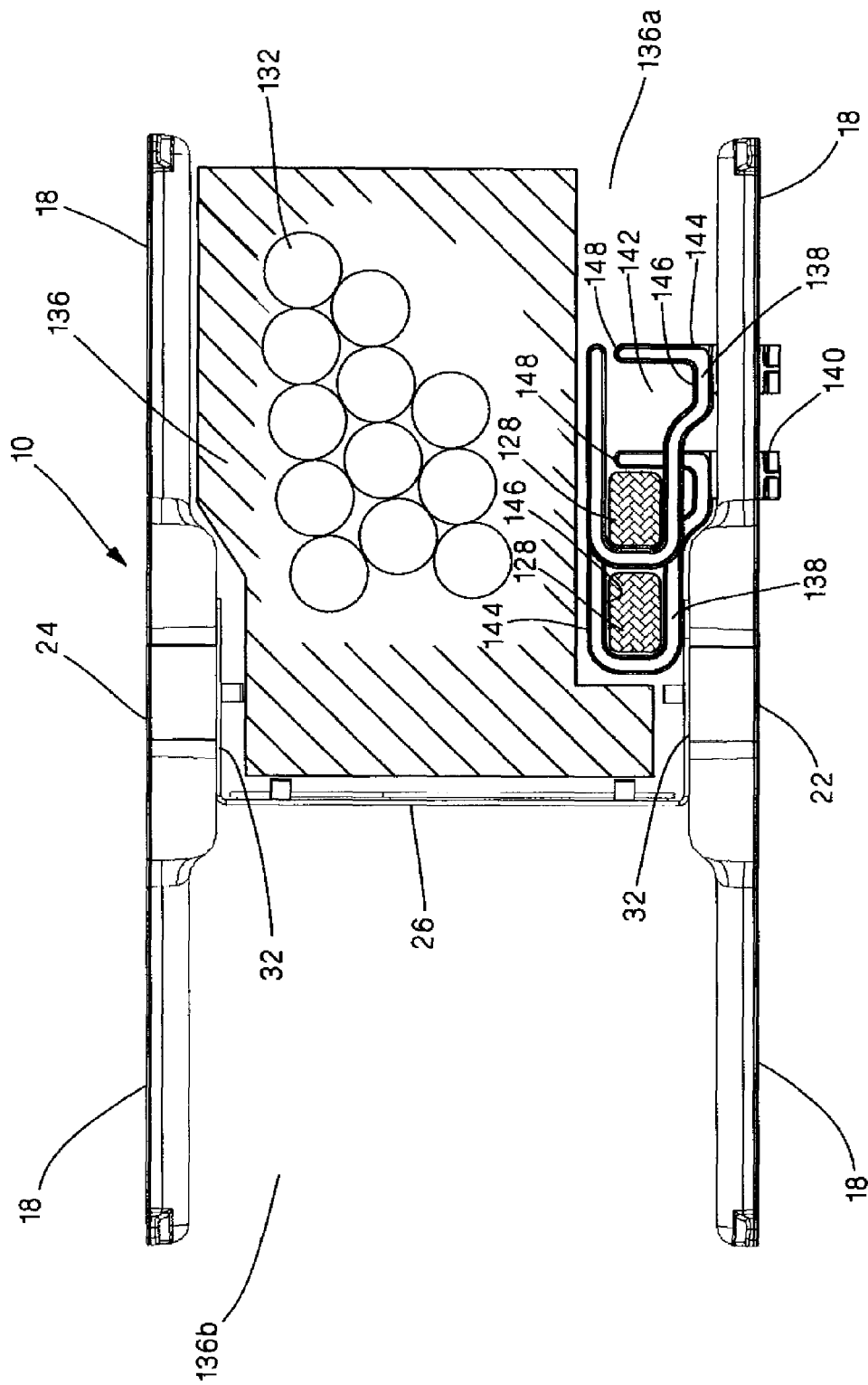
FIG. 23 is a top section view of the vertical cable manager of FIG. 22 taken along line 23-23, showing an embodiment of the present invention creating separate paths for routing the copper cables and routing the fiber optic cables using a D-ring slidably attached to a finger.

Referring to FIG. 23, a cross section view of volume 136 extending vertically in cable manager 10 is illustrated. Volume 136 extends vertically between side panels 22, 24, fingers 18 and cross brace bracket 26. Vertical volume 136 extends on both sides of cross brace bracket 26, although volume 136 is shown on only one side of cross brace bracket 26 in FIG. 23 for illustrative purposes. Copper cables 132 extend vertically along cable manager 10 in volume 136. A D-ring 138 with a snap-on feature 140, to be described, is slidably mounted on a finger 18. D-ring 138 provides a dedicated and separate pathway 142 for fiber cables 128 in volume 136 in one embodiment of the present invention.

Figure 24:
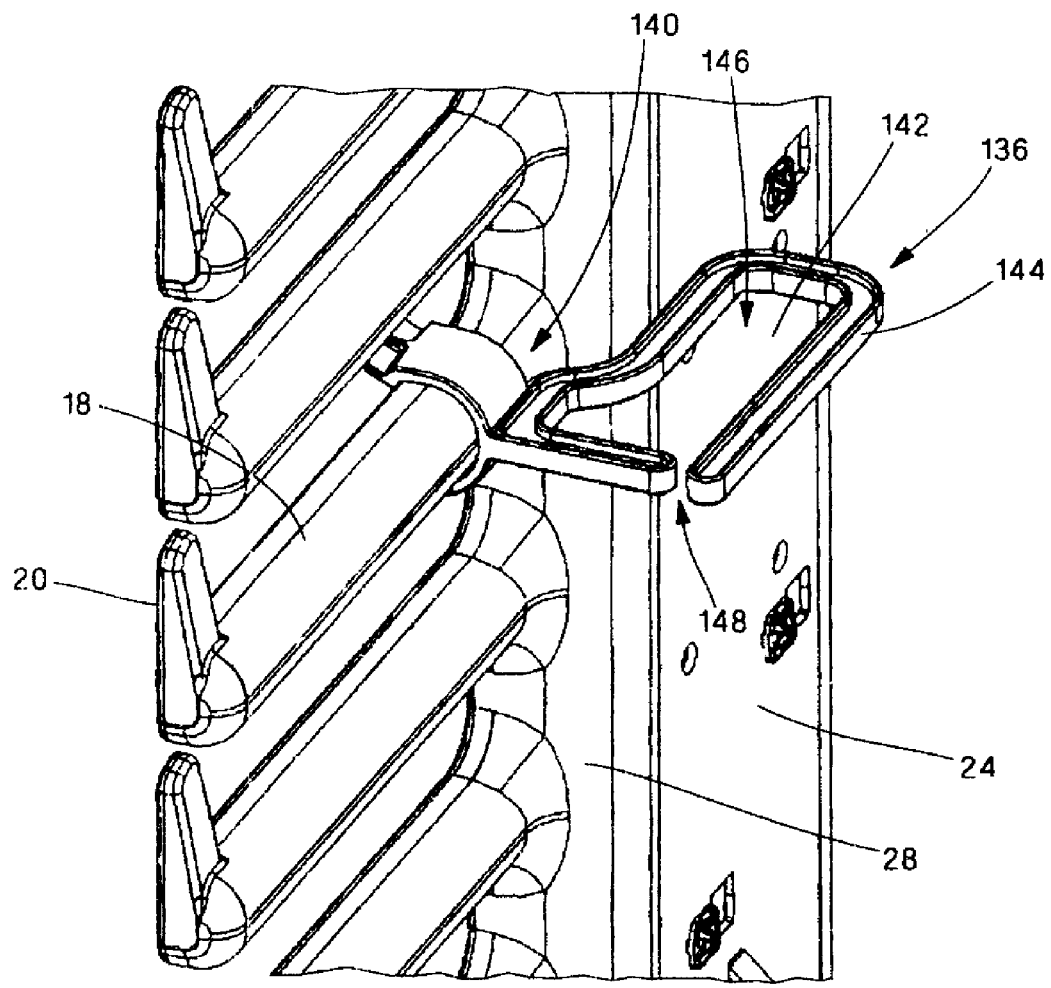
FIG. 24 is a detail perspective view of a finger segment attached to a sidewall of the cable manager of FIG. 22, with a D-ring having a first configuration slidably attached to a finger.

One embodiment of a D-ring 138 is illustrated in FIGS. 23 and 24, and includes a loop 144 defining an inner area 146, and an opening 148 providing access to inner area 146. In FIG. 23, D-ring 138 is shown in two positions, first adjacent side panel 22, and second slid along finger 18 to a second position adjacent finger 18. FIG. 24 illustrates D-ring 138 in its first position.

Figure 25:
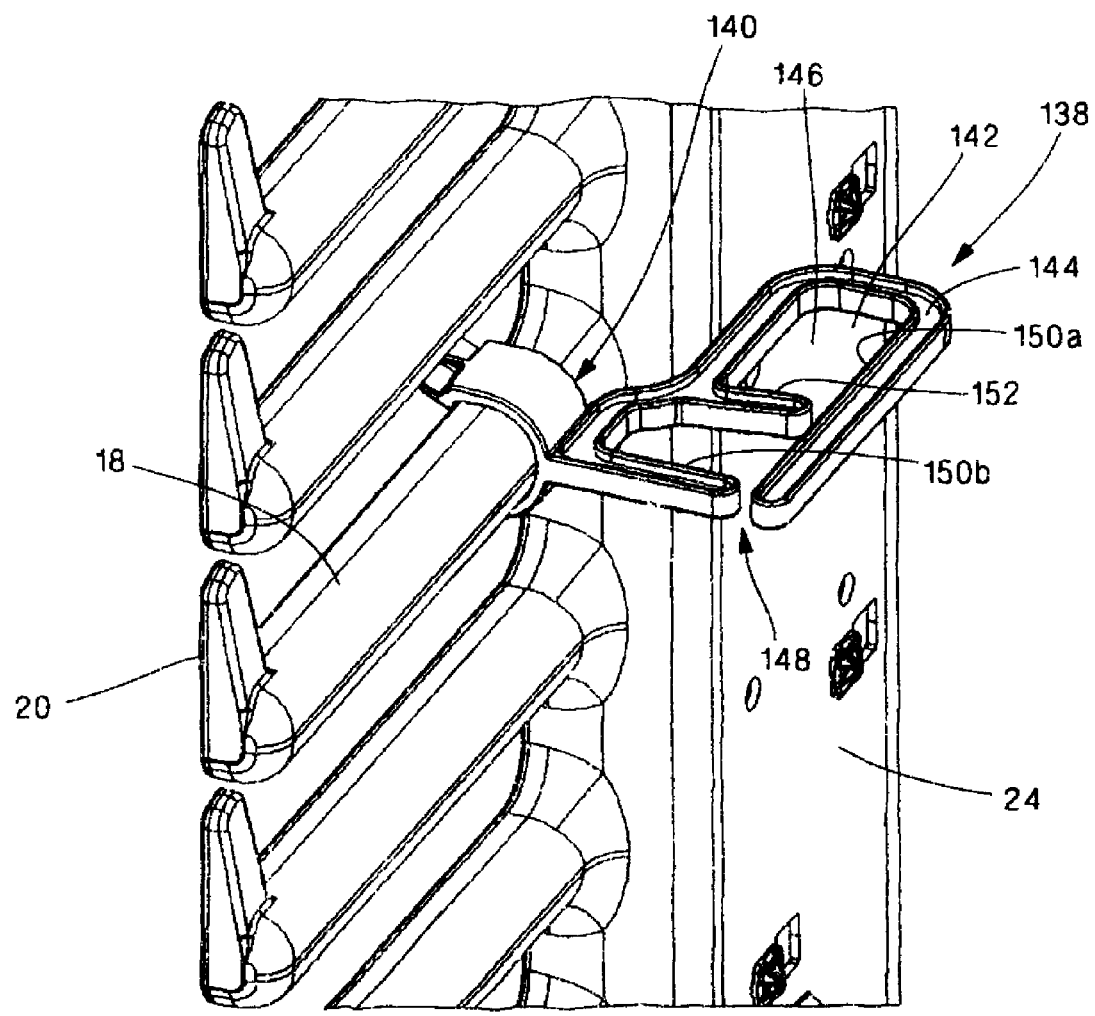
FIG. 25 is a detail perspective view of a finger segment attached to a sidewall of the cable manager of FIG. 22, with a D-ring having a second configuration slidably attached to a finger.

FIG. 25 shows another embodiment of D-ring 138 wherein inner area 150 is divided into two cable retention areas 150A and 150B by cable retention arm 152. In this embodiment, additional cable retention is provided in the fiber cable pathway.

Figure 26:
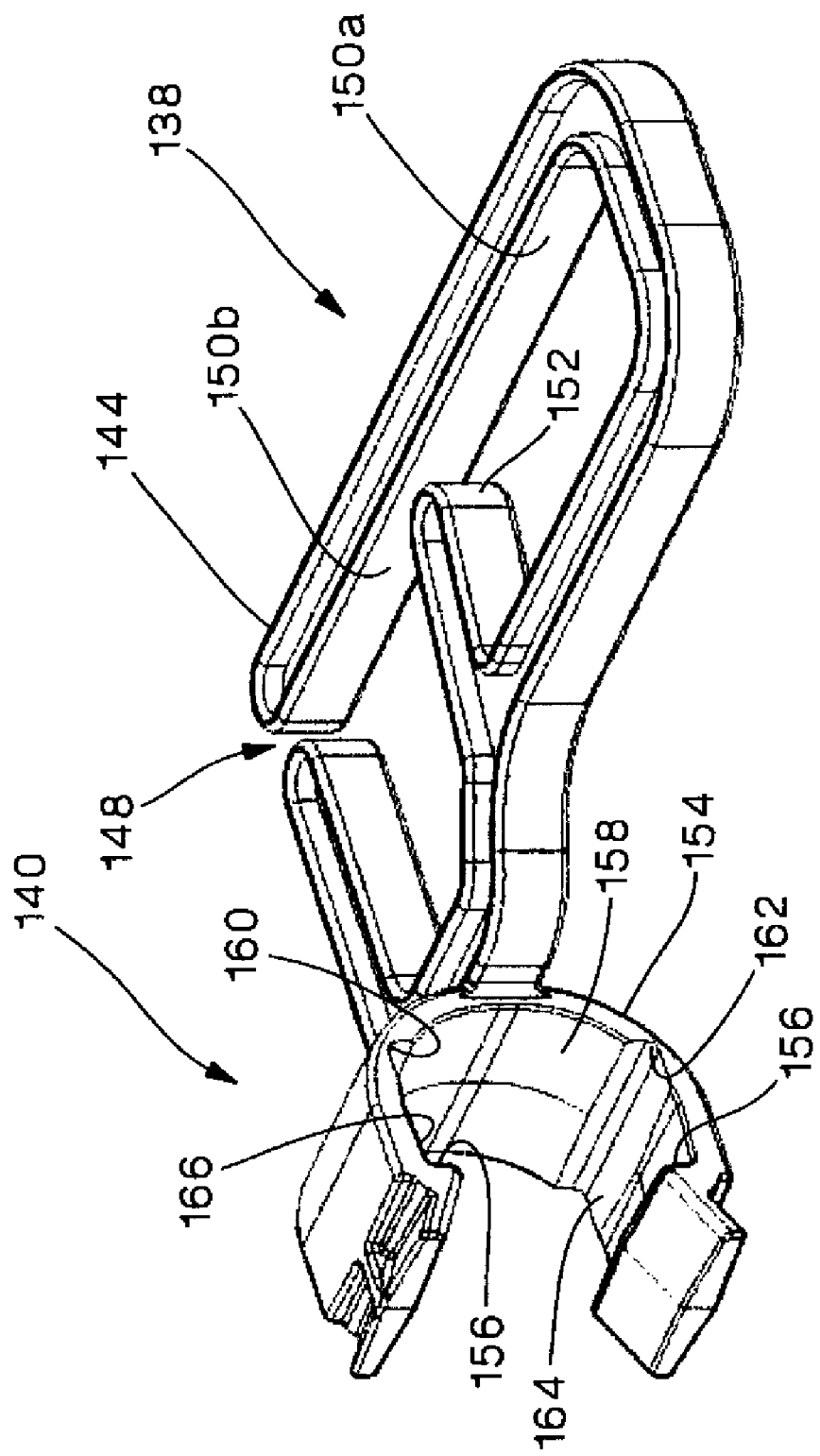
FIG. 26 is a detail perspective view of the D-ring shown in FIG. 25.

FIG. 26 is a detail view of the D-ring shown in FIG. 25, with integral snap-on feature 140. Snap-on feature 140 is common to both D-rings 138 shown in FIGS. 24 and 25. Snap-on feature 140 is adapted to slidably mount a D-ring 138 on any one of fingers 18 of cable manager 10. It is contemplated that separate fiber cable pathway 142 will be formed along a substantial vertical dimension of cable manager 10 by mounting a plurality of vertically aligned D-rings 138 to several fingers 18.

Figure 27:
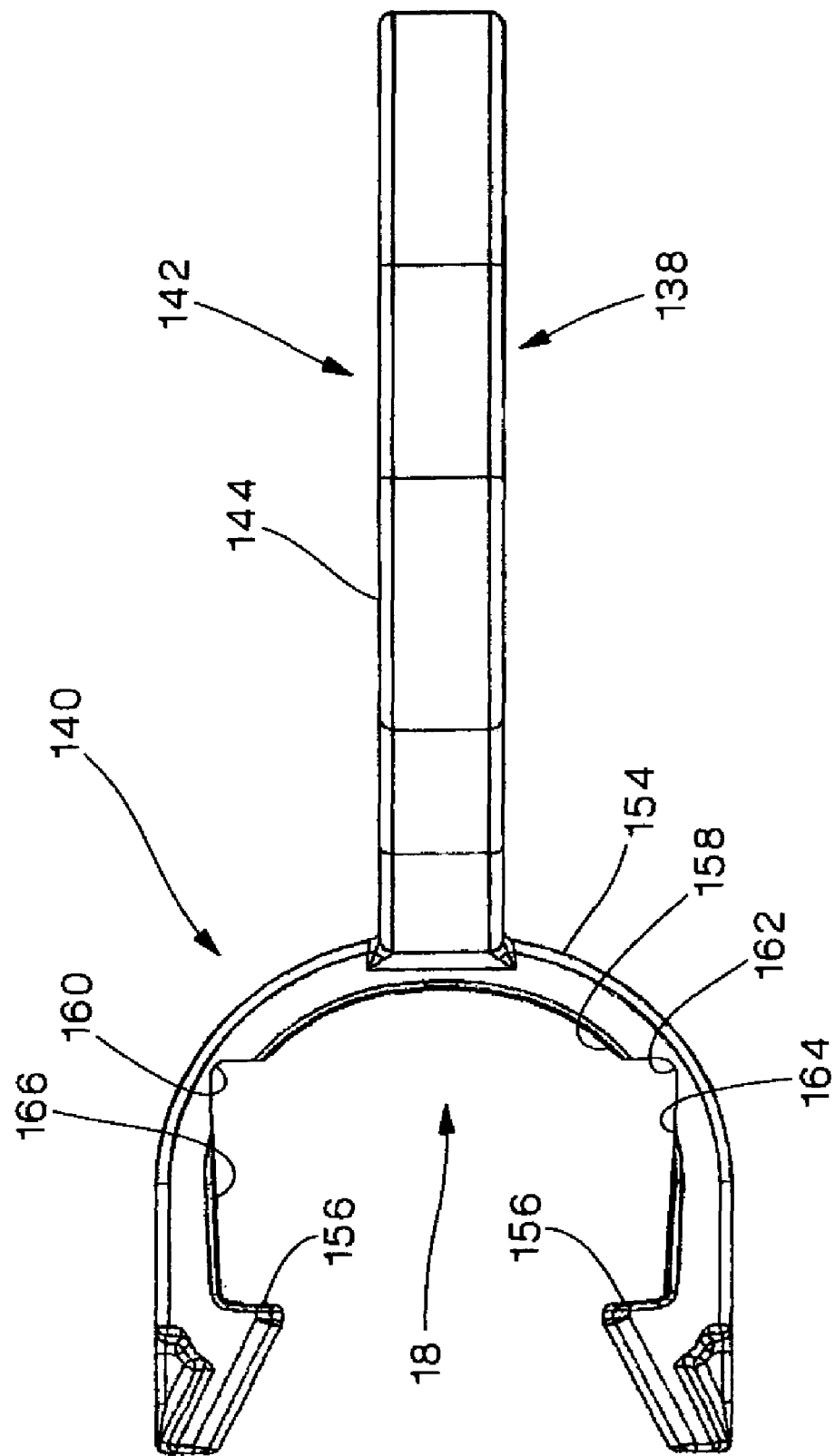
FIG. 27 is a top plan detail view of the D-ring of FIG. 26.

Referring to FIGS. 26 and 27, snap-on feature 140 is integrally formed with loop 144. Snap-on feature 140 includes a flexible semi-circular portion 154 having gripping flanges 156 on both ends of the semi-circular portion 154. The curved interior surface 158 of semi-circular portion 154 comprises cut-out indentations 160, 162. Opposed substantially flat side walls 164, 166 extend outward from respective indentations 160, 162.

Figure 28:
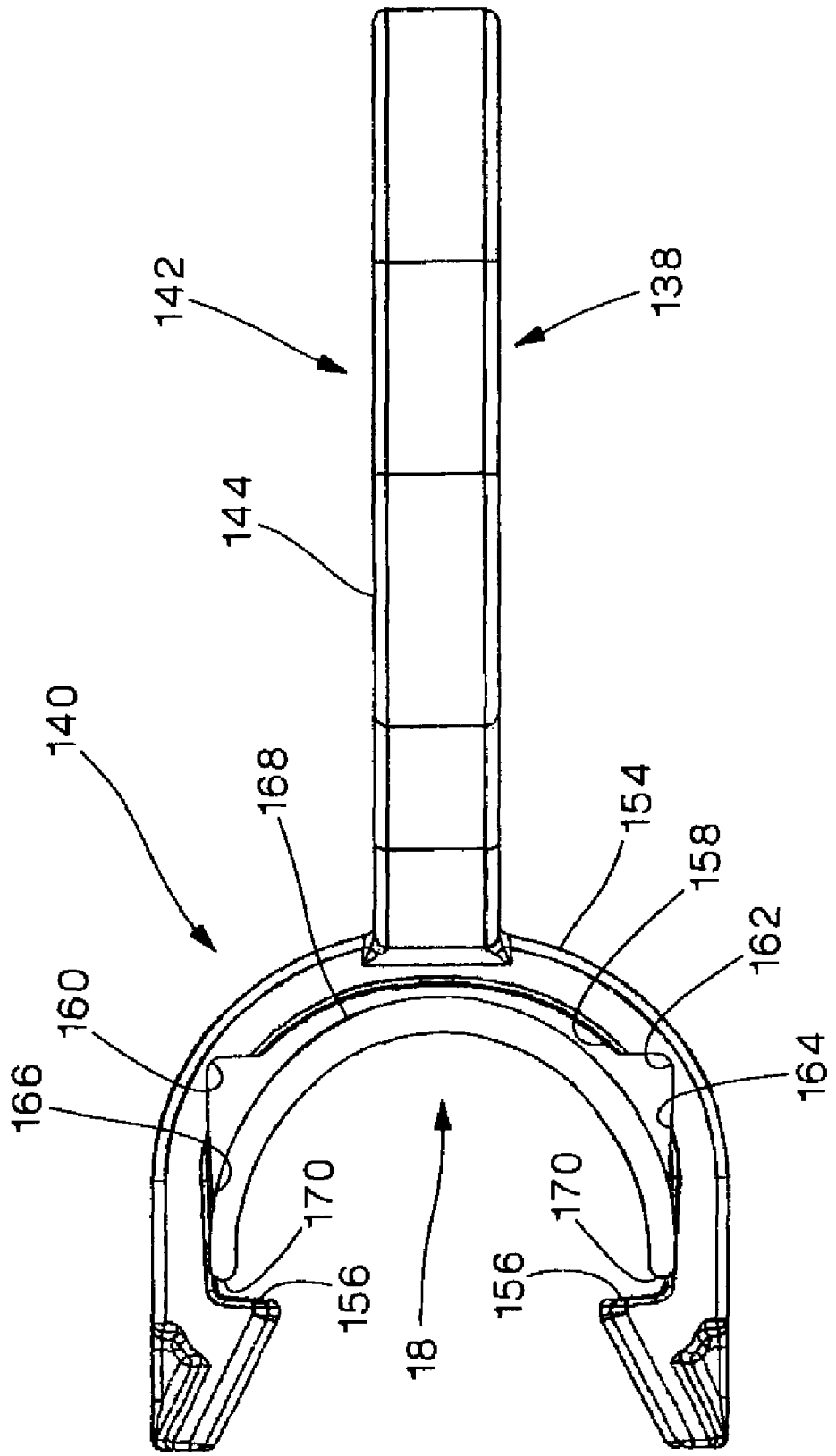
FIG. 28 is a top plan detail view of the D-ring of FIG. 26, schematically showing the D-ring assembled on a first lateral side of a finger.

FIG. 28 is a schematic view of a D-ring 138 mounted on a semi-circular finger 18 of cable manager 10. Snap-on feature 140 is advanced over curved surface 168 of finger 18, as gripping flanges 156 flex over curved surface 168. As gripping flanges 156 reach the ends 170 of finger 18, flanges 156 snap towards each other and engage finger 18. In this position, a central portion of outer surface 168 of finger 18 abuts curved interior surface 158 of snap-on feature 140, while the outer portions of finger 18 abut flat side walls 164, 166. In this manner, snap-on feature 140 securely holds D-ring 138 to finger 18, providing a separate fiber cable pathway 142 through a plurality of vertically aligned D-rings 138 similarly mounted to a plurality of fingers 18.

Figure 29:
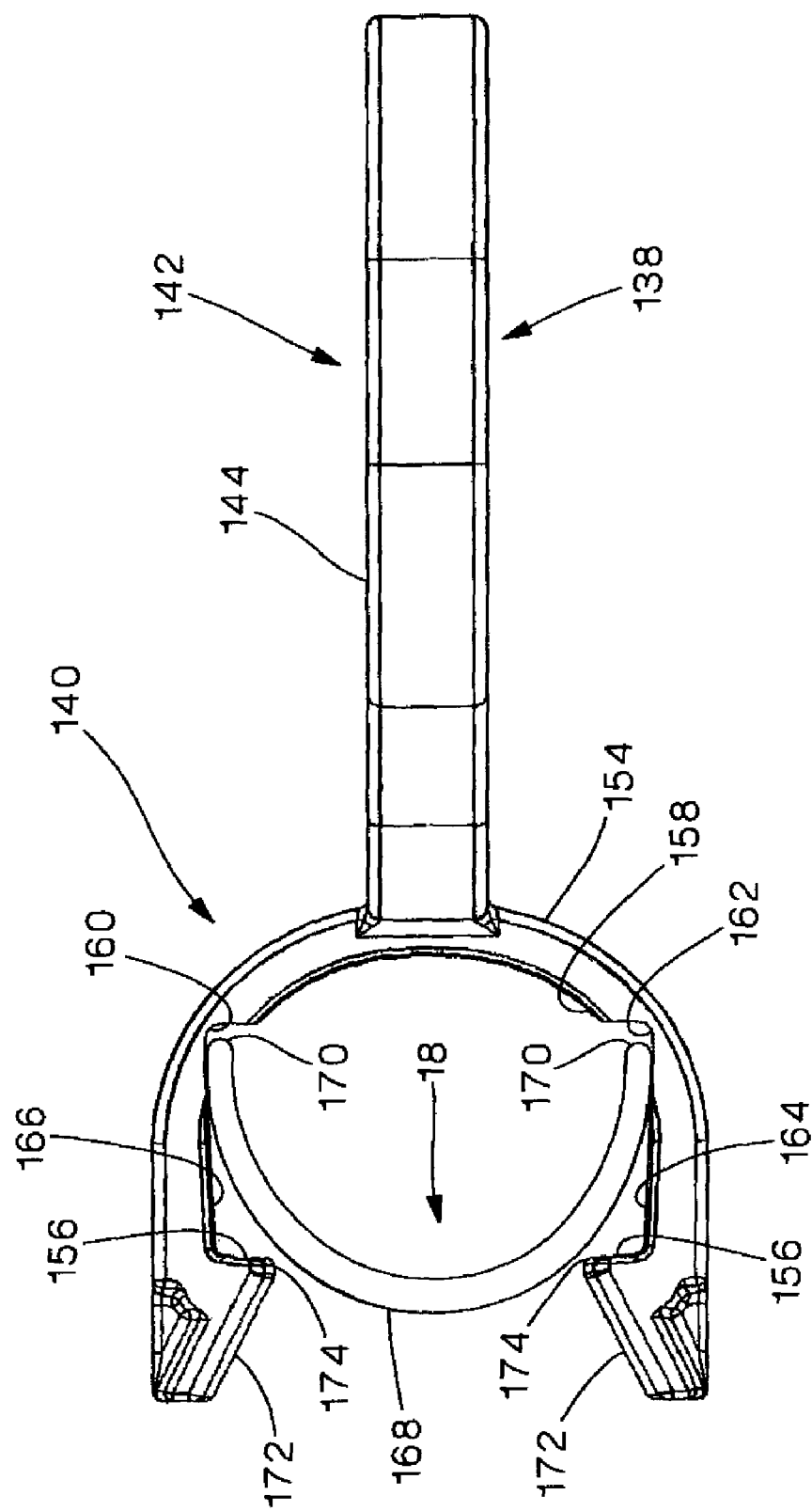
FIG. 29 is a top plan detail view of the D-ring of FIG. 26, schematically showing the D-ring assembled on a second lateral side of a finger.
Figure 30:
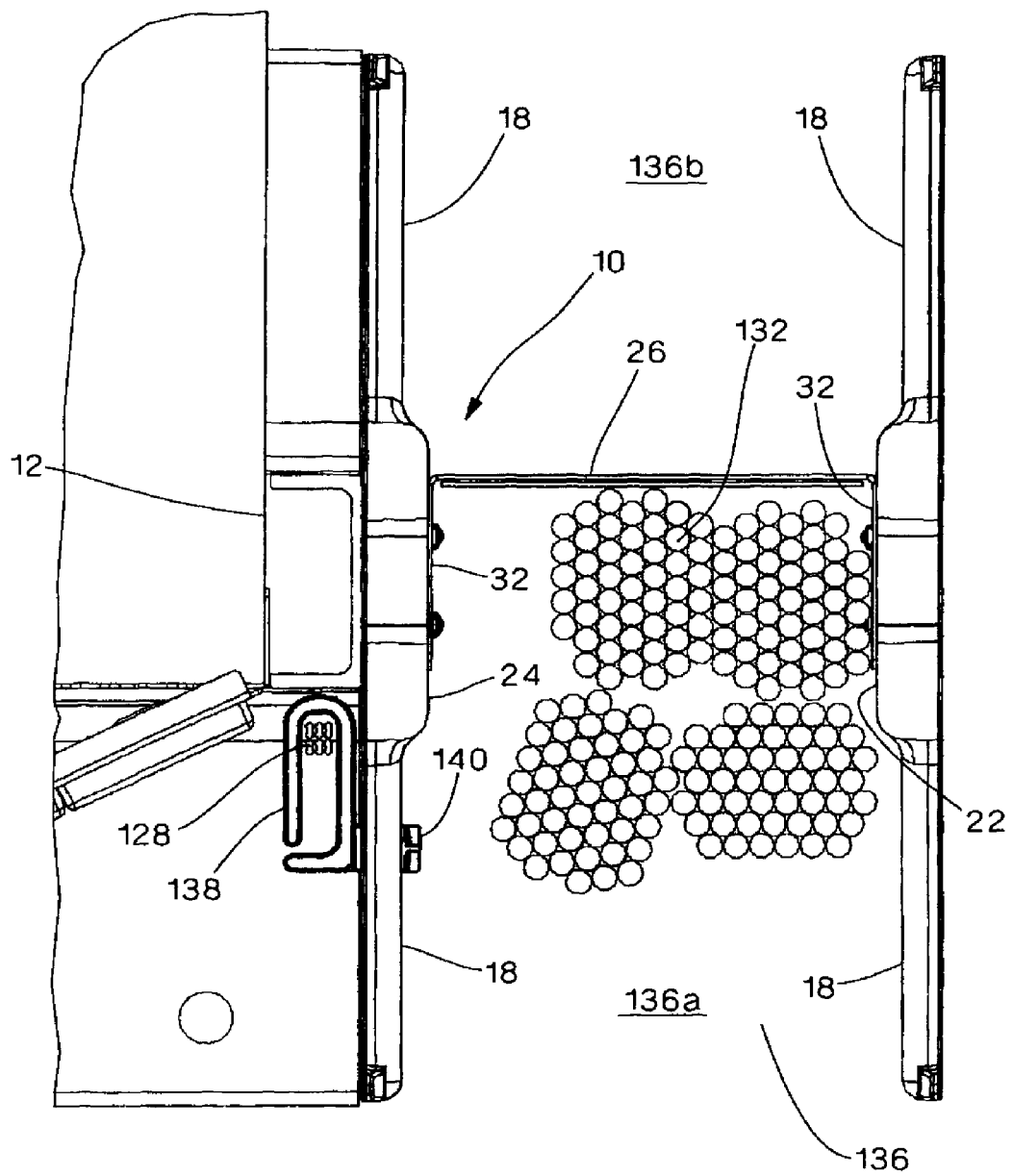
FIG. 30 is a top section view of the cable manager of FIG. 22, showing the D-ring mounted on the second lateral side of a finger and creating a routing path for fiber cables on the opposite side of the finger from the copper cables.

Each D-ring and snap-on feature is also adapted to engage a finger 18 in a position rotated one hundred eighty degrees from the mounting configuration shown in FIG. 28. Referring to FIG. 29, D-ring 138 is shown mounted on the opposite side of finger 18 relative to the connection shown in FIG. 28. Referring to FIG. 29, angled surfaces 172 of gripping flanges 156 are flexibly advanced over ends 170 and outer surface 168 of finger 18 in the position shown, until ends 170 of finger 18 are lodged in indentations 160, 162. Gripping flanges 156 then snap back towards each other until the tips 174 of flanges 156 engage outer surface 168 of finger 18, and force tips 170 of fingers 18 into tight engagement with indentations 160, 162. Thus, the same D-ring 138 and snap-on feature 140 can attach a D-ring 138 to a finger 18 such that D-ring 138 is either within volume 136 (FIG. 23), or outside of volume 136 (FIG. 30).

Figure 31:
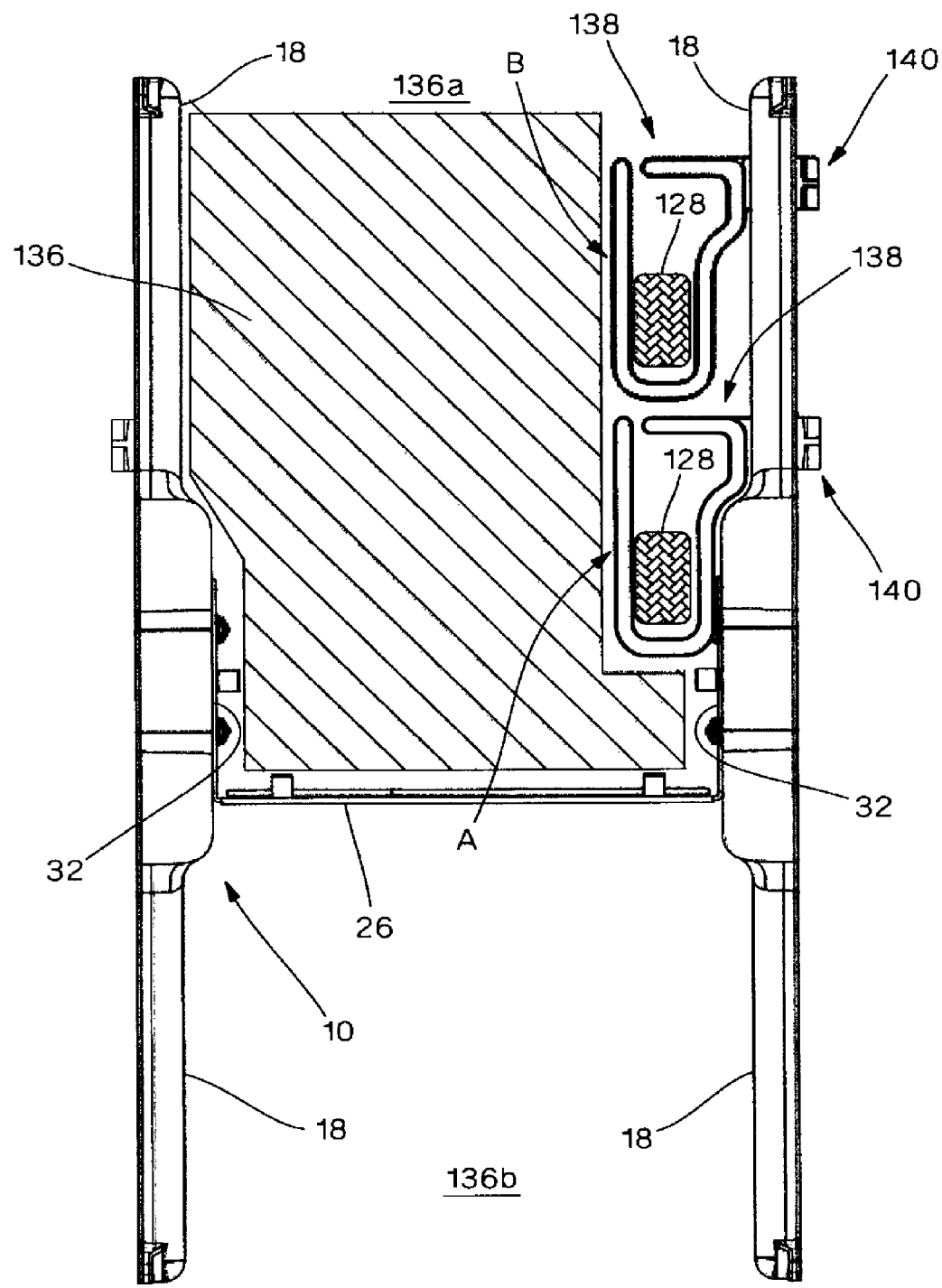
FIG. 31 is a top section view of the cable manager of FIG. 22, showing a plurality of D-rings slidably mounted on a single finger to create multiple fiber cable paths separate from the routing path of the copper cables.

FIG. 31 illustrates a D-ring 138 mounted to a finger 18, showing how the D-ring is slidably adjustable along the length of finger 18 between position A and position B. In position A of FIG. 31, D-ring 138 is located near cable management fingers 18 that have copper patch cables 128 entering the vertical cable manager 10. Position B is the location of D-ring 138 when the D-ring is aligned with fiber enclosure opening or area 126. As seen in FIG. 31, in either position A or B, fiber cables 128 are maintained separated from copper cables 132 that take up the majority of volume 136. FIG. 31 also illustrates that two D-rings 138 can be mounted on a single finger 18 to provide parallel separated fiber cable pathways 142 through the vertical cable manager 10.

Figure 32:
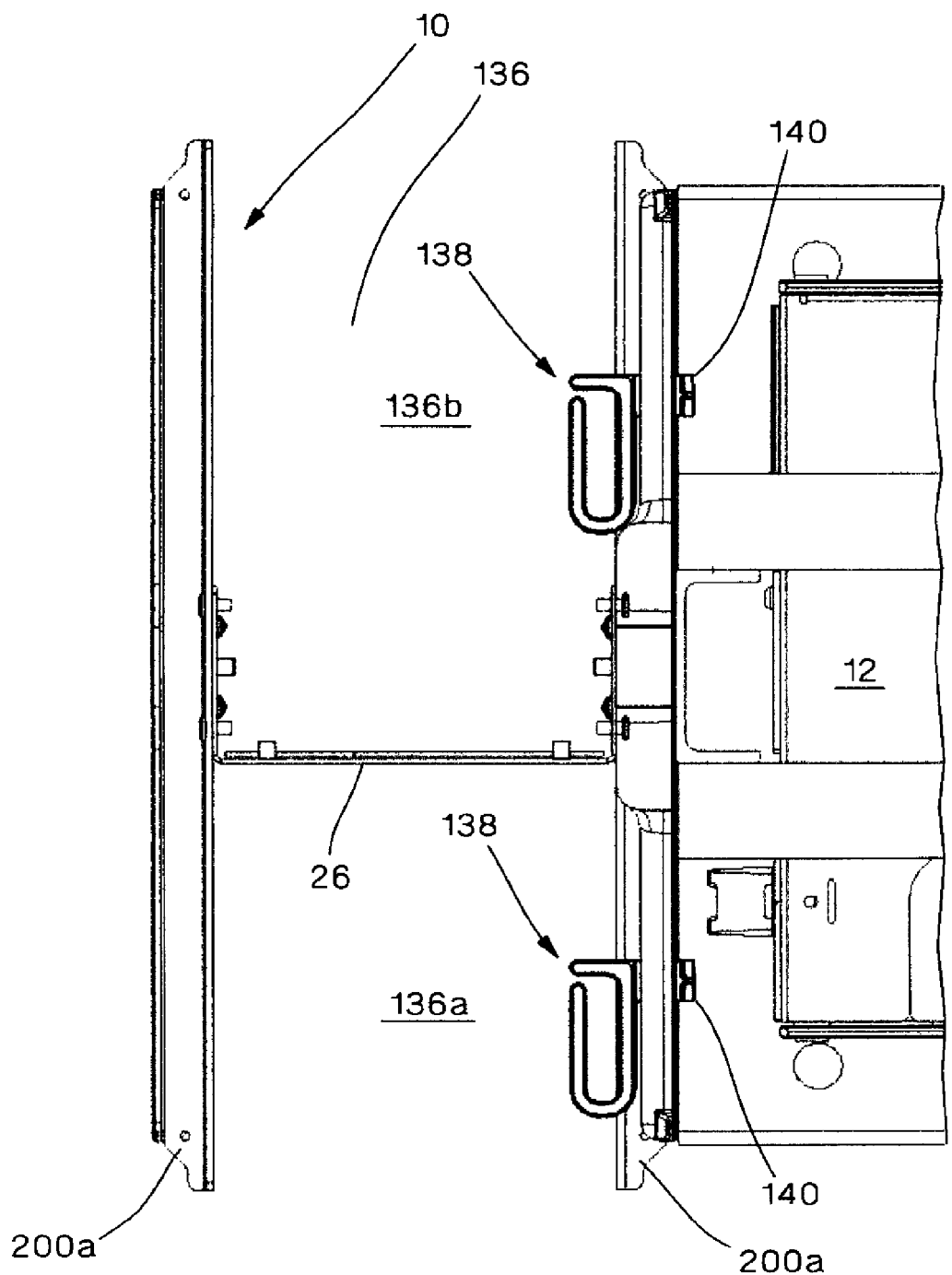
FIG. 32 is a top section view of the cable manager of FIG. 22, showing two D-rings slidably mounted on two axially aligned fingers.

FIG. 32 illustrates how a pair of D-rings 138 can be slidably attached to two oppositely extending fingers 18 to form parallel fiber cable pathways 142 in the volume 136 on both sides of cross brace bracket 26. The D-rings 138 can be attached in either the inward or outward orientation.

Figure 33:
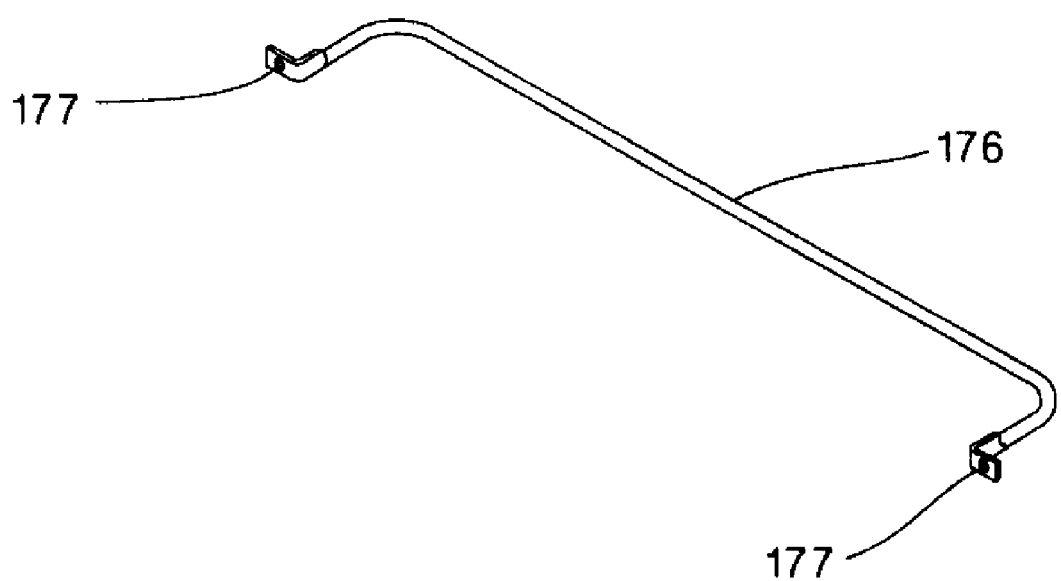
FIG. 33 is a perspective view of a prior art strain relief bar that is typically mounted horizontally in a component rack and used as a tie down for cables.
Figure 34:
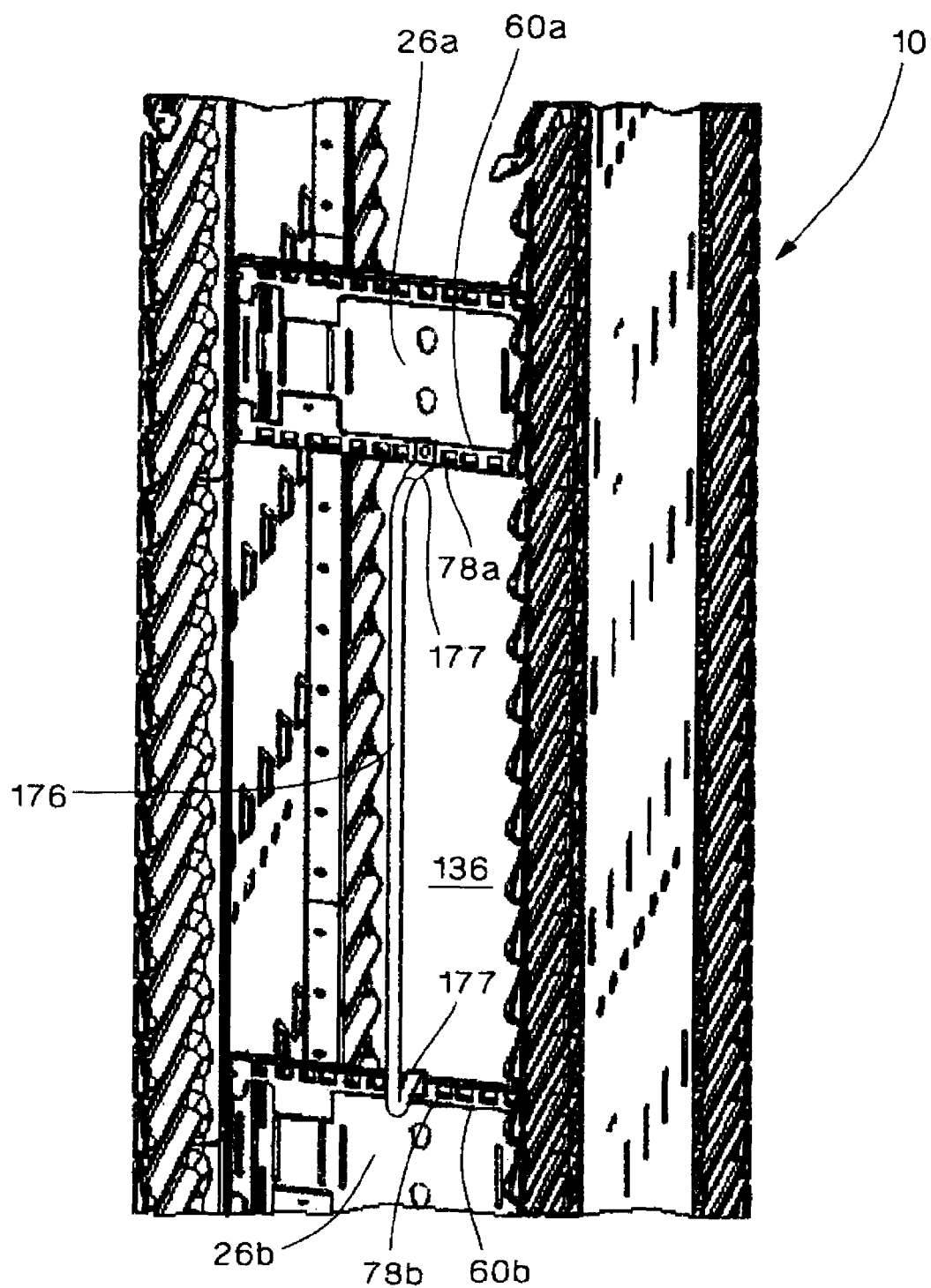
FIG. 34 is a perspective view of the strain relief bar of FIG. 33, shown attached vertically between two adjacent cross brace brackets of the cable manager of the present invention.

An embodiment of the present invention provides a plurality of cable tie off locations for mounting bundles of cables 132 or 128 at multiple depths of volume 136 of cable manager 10, and for relieving strain on the cables. FIG. 33 illustrates a strain relief bar 176 that is typically mounted horizontally in present cable managers or equipment racks to help in tying off cables. In the present invention, as illustrated in FIG. 34, strain relief bar 176 is dimensioned in accordance with EIA-310 standards and is attached at one end by mounting bracket 177 to a rectangular cutout 78A formed in a lower modified locking bracket 60A assembled to upper cross brace bracket 26A. The other end of strain relief bar 176 is attached to rectangular cutout 78B formed in an upper modified locking bracket 60B assembled to lower cross brace bracket 26B by suitable fasteners. It is apparent that vertically or horizontally routed copper cables 132 or fiber cables 128 could be attached to strain relief bar 176 with cable ties or other fastening devices, as is known in the art.

The improved strain relief bar of the present invention offers multiple tie off locations across the cross-wise horizontal dimension of volume 136 of cable manager 10. The strain relief bar 178 shown in FIG. 35 includes three struts 178 A, B and C. Referring to FIG. 36 when the mounting brackets 177 of strain relief bar 178 are attached to rectangular cutouts 78A and B by suitable fasteners, and thus to upper and lower modified locking brackets 60A and 60B, or cross brace brackets 26A and B struts 178A, B and C extend laterally outward into volume 136 of cable manager 10. Comparing FIGS. 34 and 36, it is apparent that strain relief bar 178 (FIG. 36) extends further outward in the horizontal direction then does single strut strain relief bar 176 (FIG. 34), and provides added tie off locations for cables 128, 132 routed through volume 136 of cable manager 10.

Referring to FIGS. 3 and 23, cross brace member 26 is located off center between fingers 18 attached to side panels 22, 24, which creates a larger portion 136A of volume 136 on one side of cross brace bracket 26, and a smaller volume 136B on the other side of cross brace bracket 26. In the embodiment illustrated in FIG. 36, the three struts 178A, B and C extend outward into smaller portion 136B of volume 136, providing three vertically extending tie off locations for cables 132 extending through portion 136B of volume 136 between modified locking brackets 60A, 60B and/or between adjacent cross brace brackets 26A, and 26B.

Figure 35:
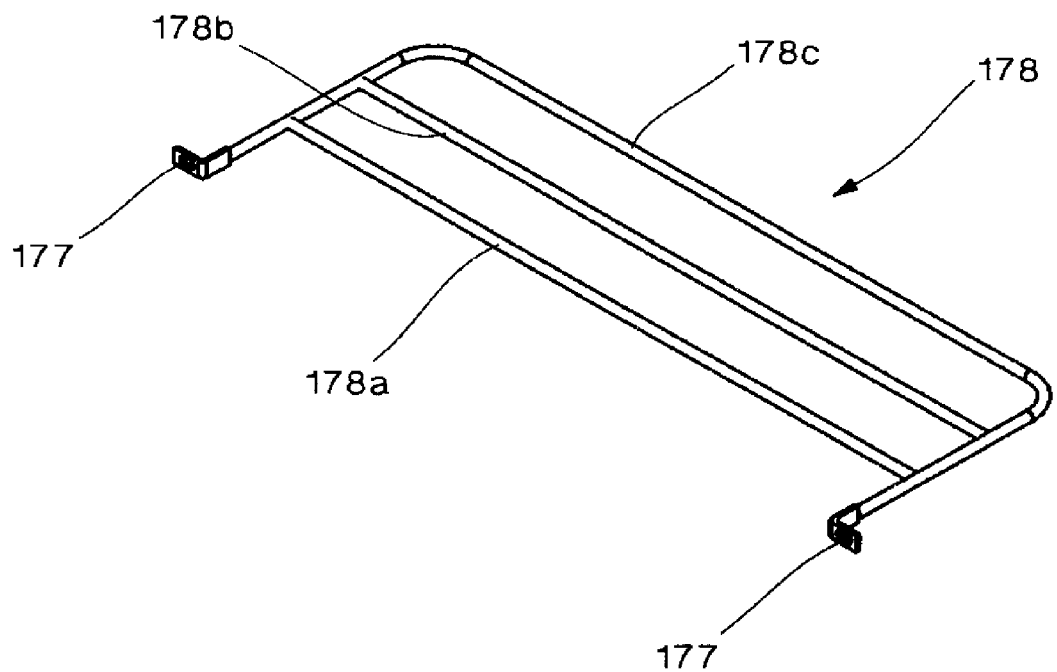
FIG. 35 is a detail perspective view of an embodiment of a strain relief bar constructed in accordance with the present invention.
Figure 36:
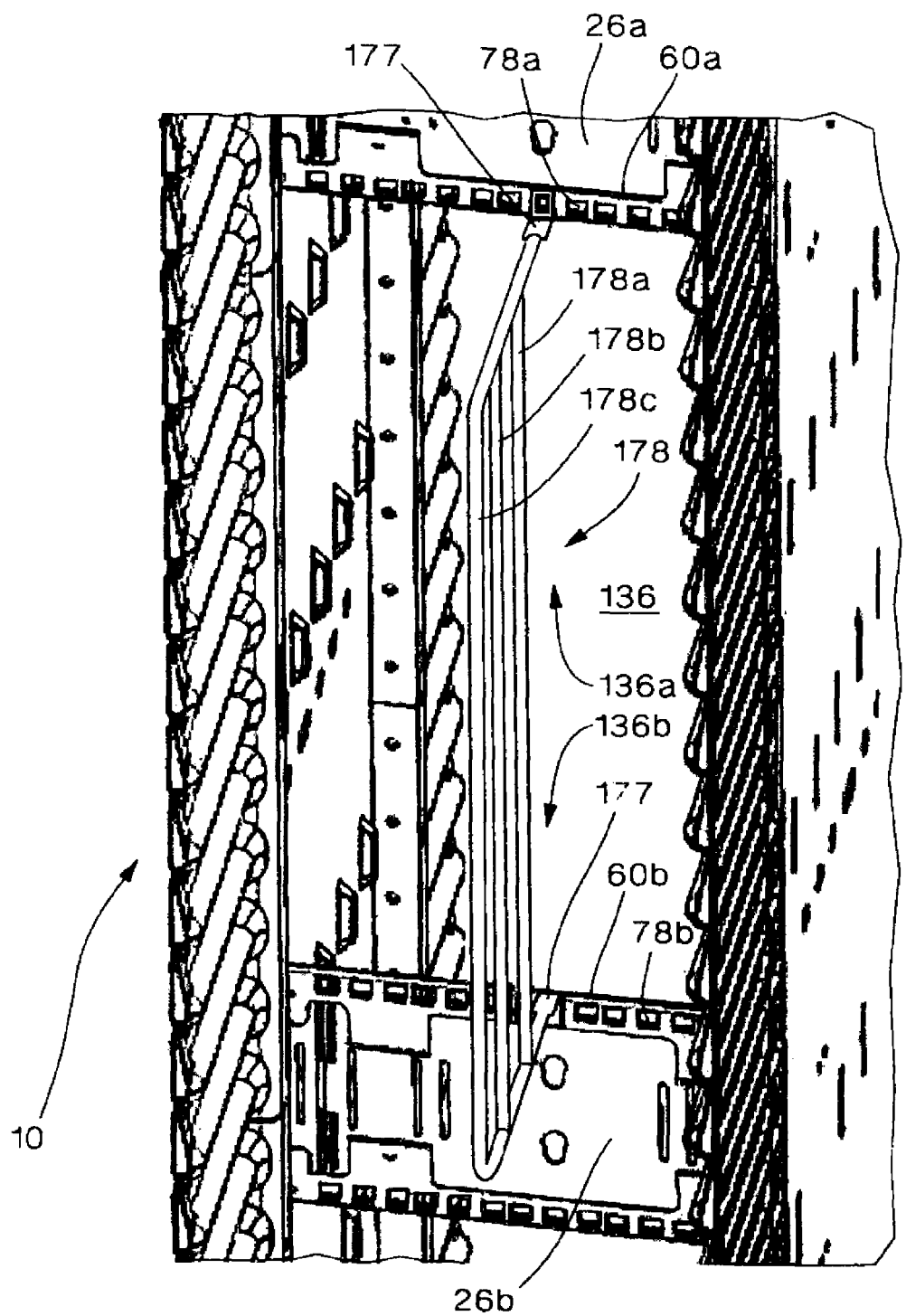
FIG. 36 is a perspective detail view showing the strain relief bar of FIG. 35 vertically mounted on two cross brace brackets of the cable manager of the present invention.
Figure 37:
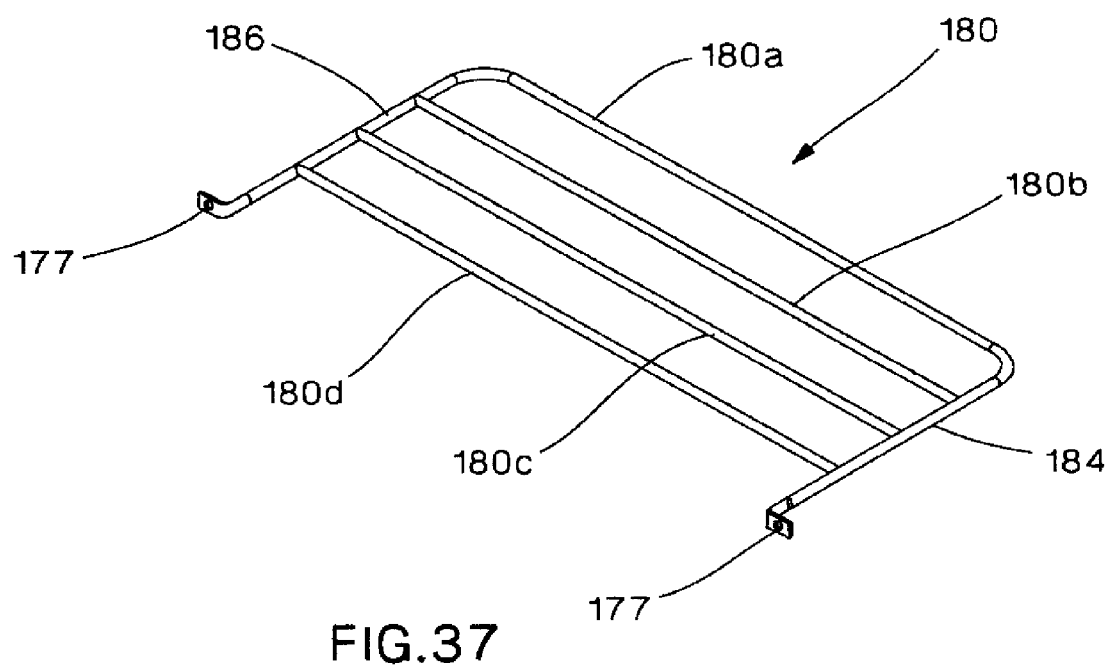
FIG. 37 is a perspective detail view of a further embodiment of a strain relief bar constructed in accordance with the present invention.

FIG. 37 illustrates an alternate embodiment of strain relief bars 176 (FIG. 33) and 178 (FIG. 35). The strain relief bar 180 of FIG. 37 comprises four struts 180A, B, C and D. Strain relief bar 180 is made of single piece side rods 184, 186 to which struts 180A, B, C and D are attached, such as by welding, brazing, or other suitable attachment methods as are known in the art.

Figure 38:
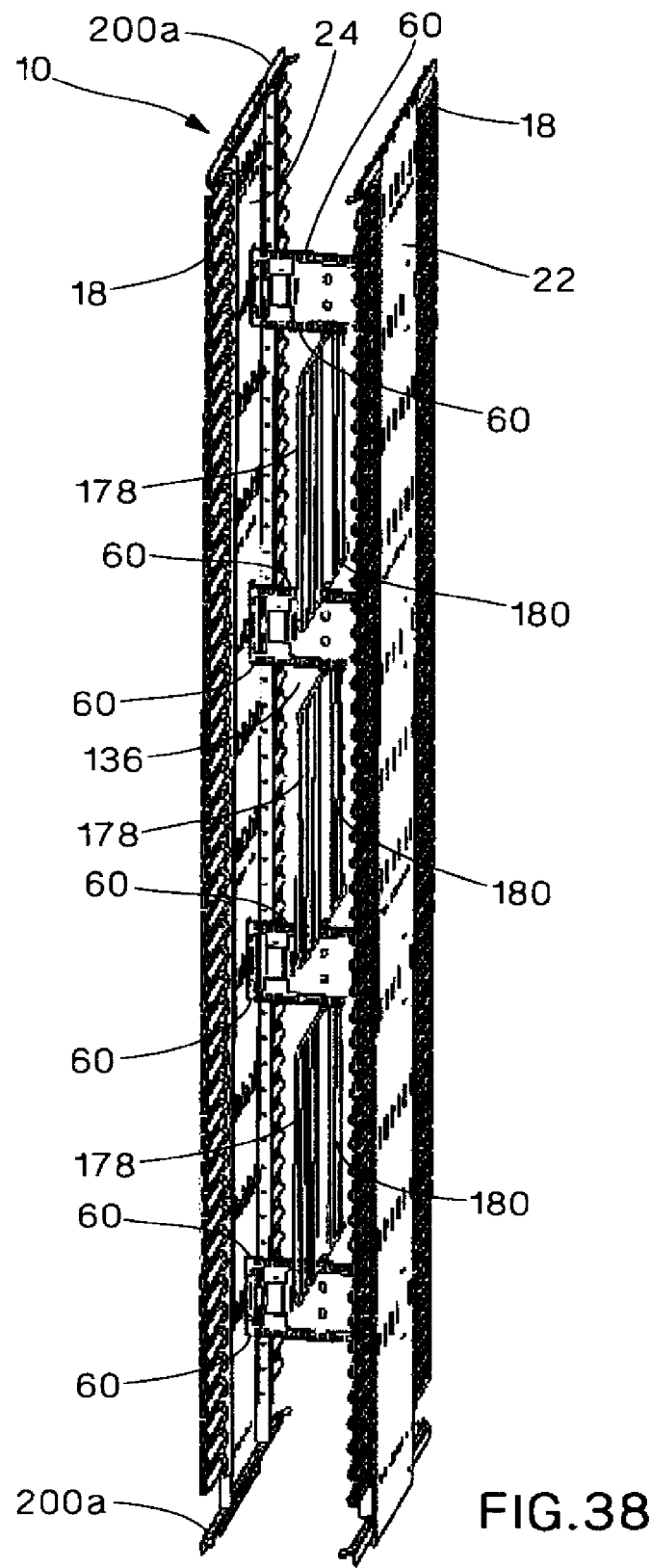
FIG. 38 is a front perspective view of an embodiment of the present invention, showing a plurality of strain relief bars of FIG. 37 attached on both sides of the cross brace brackets of the cable manager of the present invention.
Figure 39:
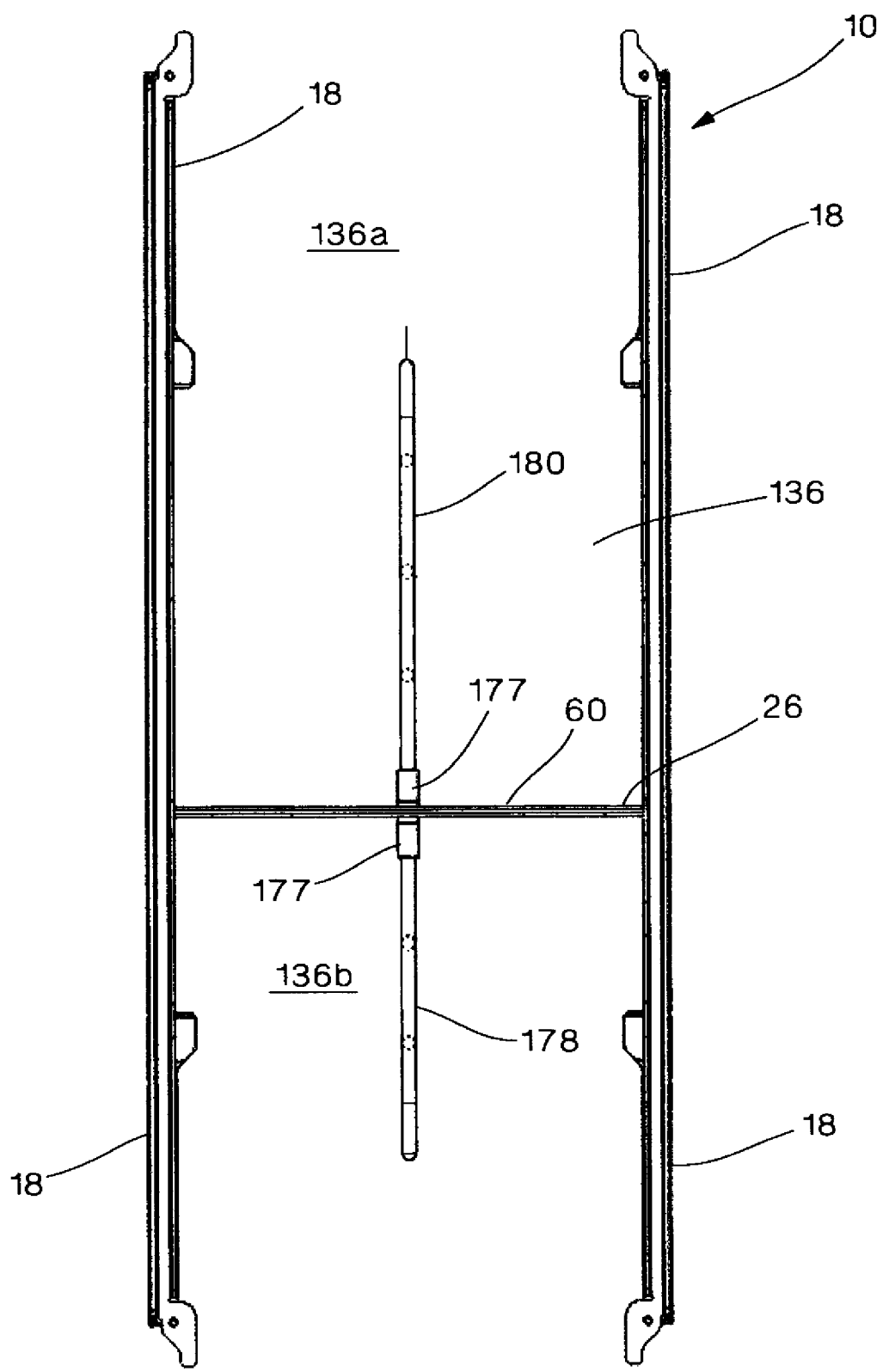
FIG. 39 is a top section view of the cable manager assembly of FIG. 38, showing the strain relief bars of FIGS. 35 and 37 mounted on the cross brace brackets of the cable manager.

As seen in FIGS. 38 and 39, a plurality of strain relief bars 178 and 180 are mounted on respective modified locking brackets 60 and cross brace brackets 26. Strain relief bar 178, with three struts 178A, B and C, extends horizontally from cross brace bracket 26 into smaller portion 136B of volume 136 of cable manager 10. Strain relief bar 180, with four struts 180A, B, C and D, extends horizontally from cross brace bracket 26 into larger portion 136A of volume 136. With both strain relief bars 178 and 180 mounted to several adjacent cross brace brackets 26 as shown in FIG. 38, multiple tie down locations for cables routed through volume 136 of cable manager 10 are provided.

Figure 40:
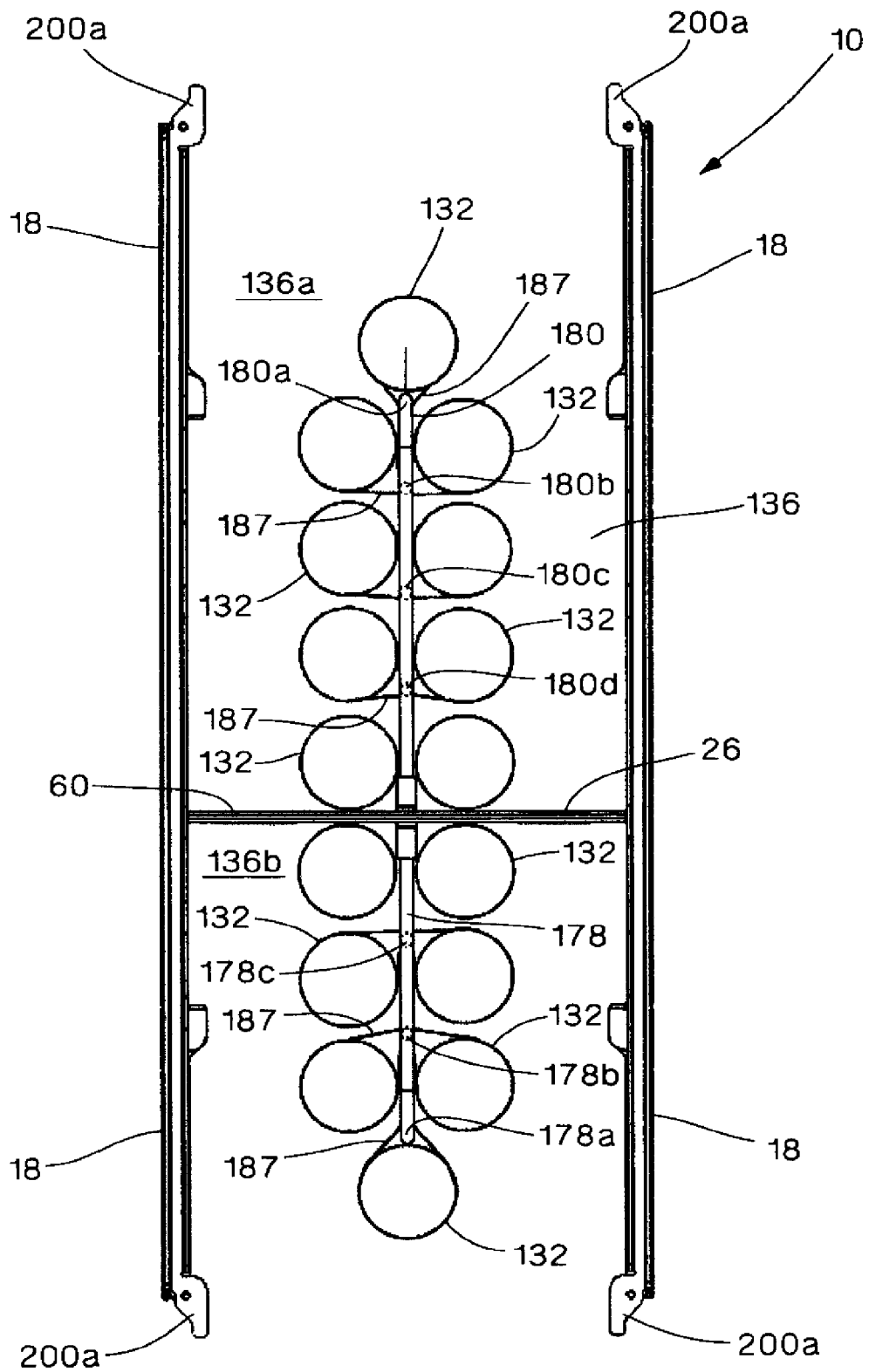
FIG. 40 is a top section view of the cable manager assembly illustrated in FIG. 38, showing a plurality of cables tied down to the two strain relief bars.

Referring to FIG. 40, a plurality of cables or cable bundles 132 are shown tied down to strain relief bars 178, 180. Each cable or cable bundle 132 is fastened to a vertically extending strut 178A, B or C and 180A, B, C, or D, using cable ties 187 or other suitable attachment means as are known in the art. The tie down capability substantially along the entire length of cable manager 10 (FIG. 38) prevents the cables from tangling and interweaving in cable manager 10, increasing the ease of traceability and maintenance of the cables and cable bundles.

The present invention also includes several embodiments wherein the side panels 22, 24 of cable manager 10 provide ventilation of hot air created by the electrical components mounted to component rack 12, or to cable manager 10. As schematically shown in FIG. 21, cable manager 10 allows optional vertical mounting of EIA-310 standard horizontal equipment, as represented by panel 120 in FIG. 21, such as heat generating patch panels and power strips. Thermal management by way of ventilation is provided in the present invention by allowing air circulation in and out of cable manager 10 through various patterns of perforations in selected areas of side panels 22, 24. The ventilation perforations of the present invention allow air that normally would be blocked by a wide cable manager side panel to pass freely from the fans of the various electronic components mounted on component rack 12 into and out of the interior of the cable manager 10 to enhance cooling.

Figure 41:
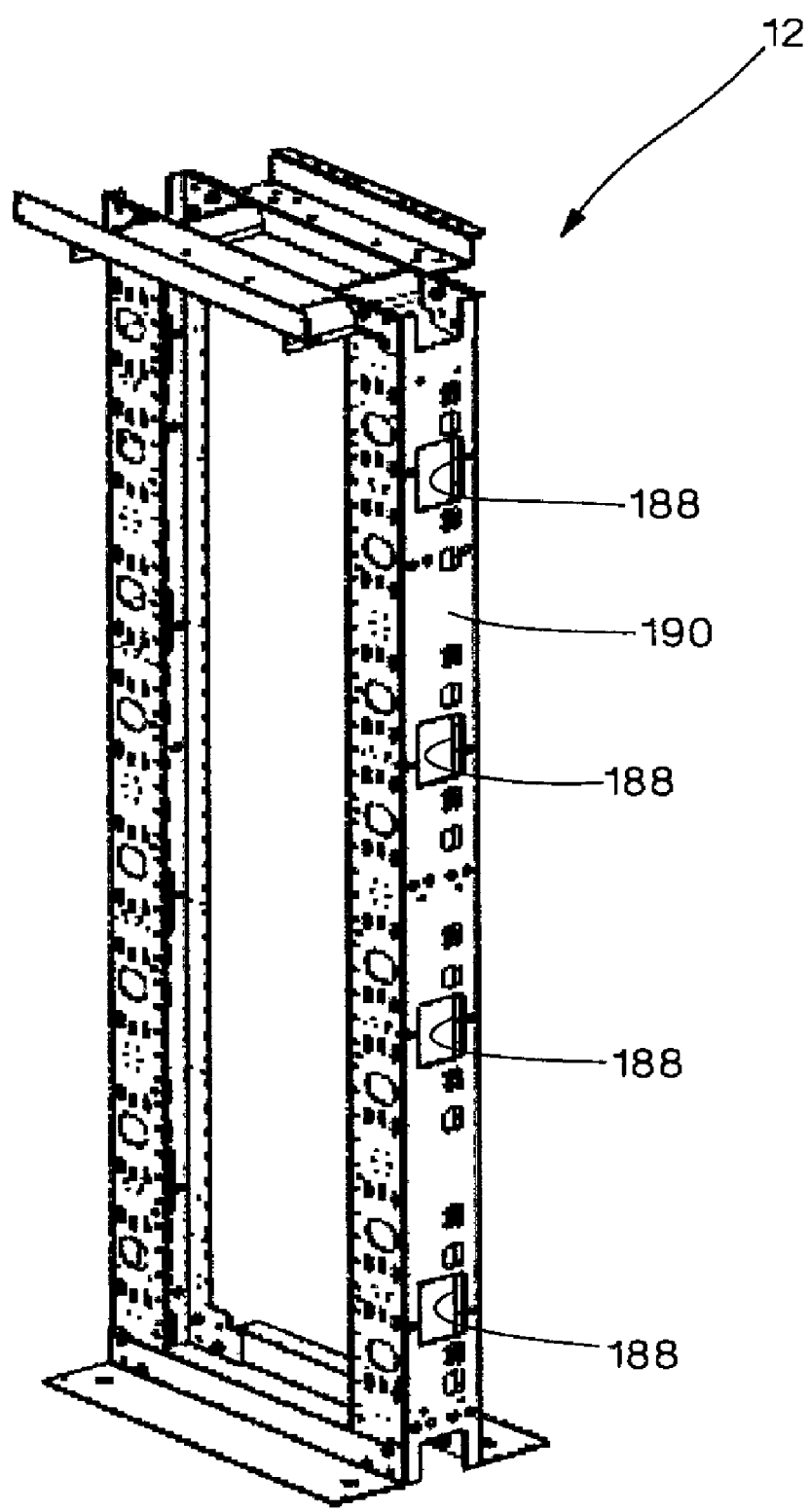
FIG. 41 is a front perspective view of a typical component rack, shown without components, and illustrating the location of ventilation apertures in the side walls of the rack.

FIG. 41 illustrates a typical component rack 12, without components mounted, and with rectangular cutouts 188 in side wall 190 located approximately adjacent the ventilating fans of electronic components that would be mounted to rack 12. While not shown in FIG. 41, an opposed side panel of rack 12 would also include rectangular cutouts at the same vertical location as cutouts 188.

Figure 42:
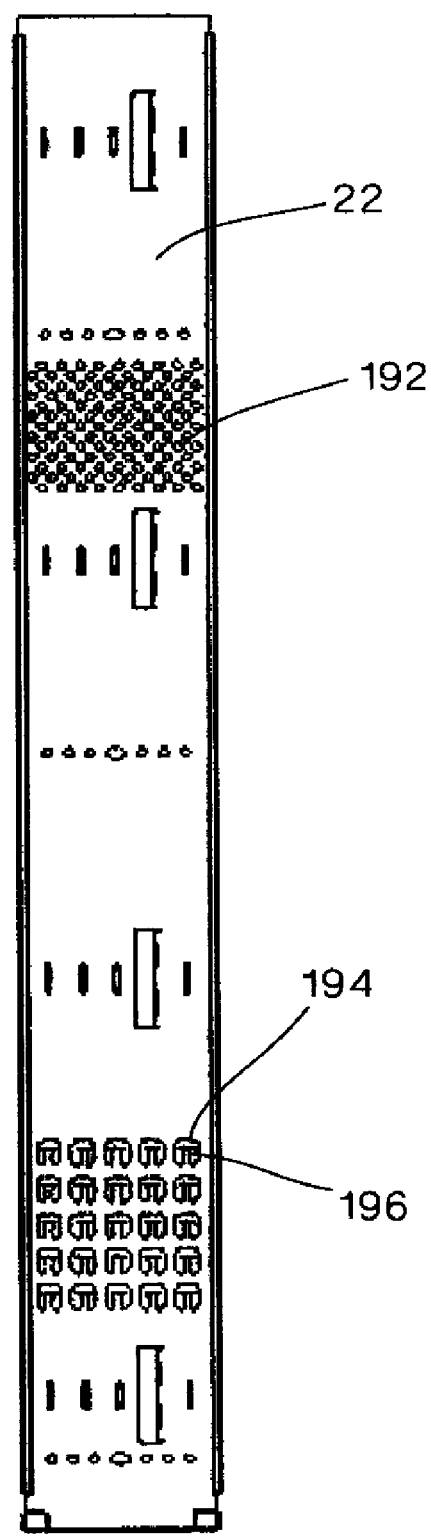
FIG. 42 is a side elevation view of the cable manager of FIG. 41, showing ventilation provided in one embodiment by multiple apertures spaced close together, and in another embodiment using U-shaped cutouts that provide a tie-down capability in addition to ventilation.

FIG. 42 illustrates the side panel 22 of the cable manager 10, with two embodiments of ventilation apertures through side panel 22. In one embodiment, the ventilation perforations comprise a plurality of apertures 192 spaced close together to provide ventilation in and out of volume 136 of cable manager 10. The opposite side wall 24, not shown, is similarly perforated. In a second embodiment of ventilation perforations shown in FIG. 42, the perforations comprise a plurality of close-together U-shaped cutouts or apertures 194 extending through side panel 22. Each aperture 194 includes a tongue portion 196 extending into the center of each aperture 194. The tongue portions 196 also allow for cable tie-offs. The opposite side wall 24, not shown, also includes U-shaped apertures 194 for ventilation.

Figure 43:
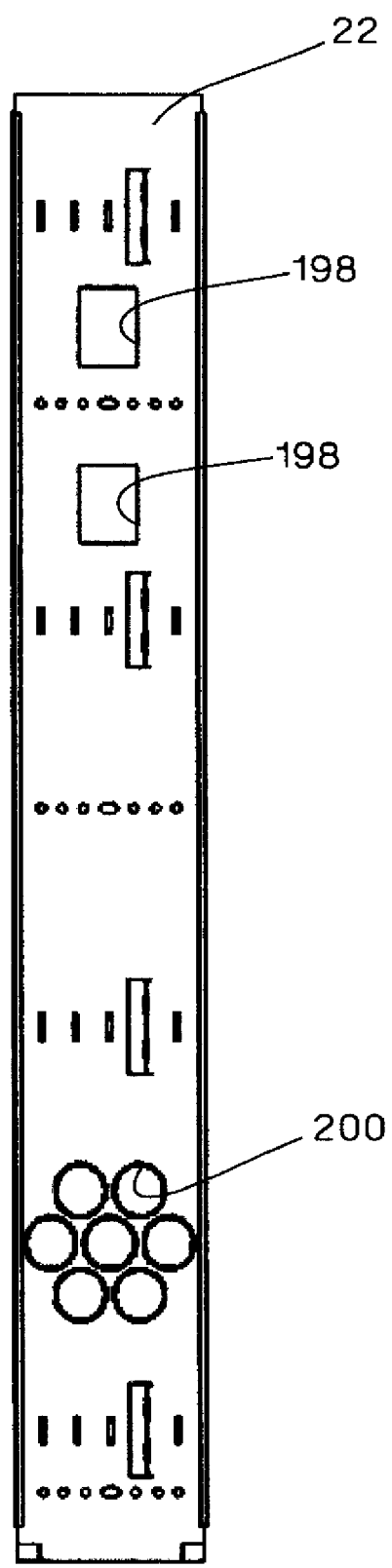
FIG. 43 is a side elevation view of the cable manager of FIG. 41, showing ventilation provided in one embodiment by rectangular cutouts, and in another embodiment by multiple pass-through apertures placed close together that also provide tie-off capabilities as well as ventilation.

FIG. 43 also illustrates side panel 22 of cable manager 10, with two additional embodiments of ventilation apertures through side panel 22. In a third embodiment, the ventilation embodiment comprises rectangular cutouts 198 extending through side panel 22. In this embodiment, it is preferable that rectangular cutouts 198 in cable manger 10 be aligned with rectangular cutouts 188 in component rack 12 (FIG. 41) to provide the proper ventilation. The opposite side wall 24, not shown, also includes similarly located rectangular cutouts 198 for ventilation.

FIG. 43 additionally illustrates a fourth embodiment of ventilation apertures extending through side panel 22 and opposing side panel 24, (not shown) of cable manager 10. In this embodiment, multiple pass-through apertures 200 are placed close together on side panel 22 to provide strength or rigidity and proper ventilation. The proximity of each aperture 200 also creates additional tie-off options for securing cables 128, 132 to the cable manager 10.

The various ventilation options shown in FIGS. 42 and 43 may be used alone, or combined in various layouts to provide appropriate ventilation. In addition, it is also preferable that apertures 192 (FIG. 42), U-shaped apertures 194 (FIG. 42) and pass through apertures 200 (FIG. 43) be aligned with rectangular cutouts 188 in component rack 12 (FIG. 41).

Figure 44:
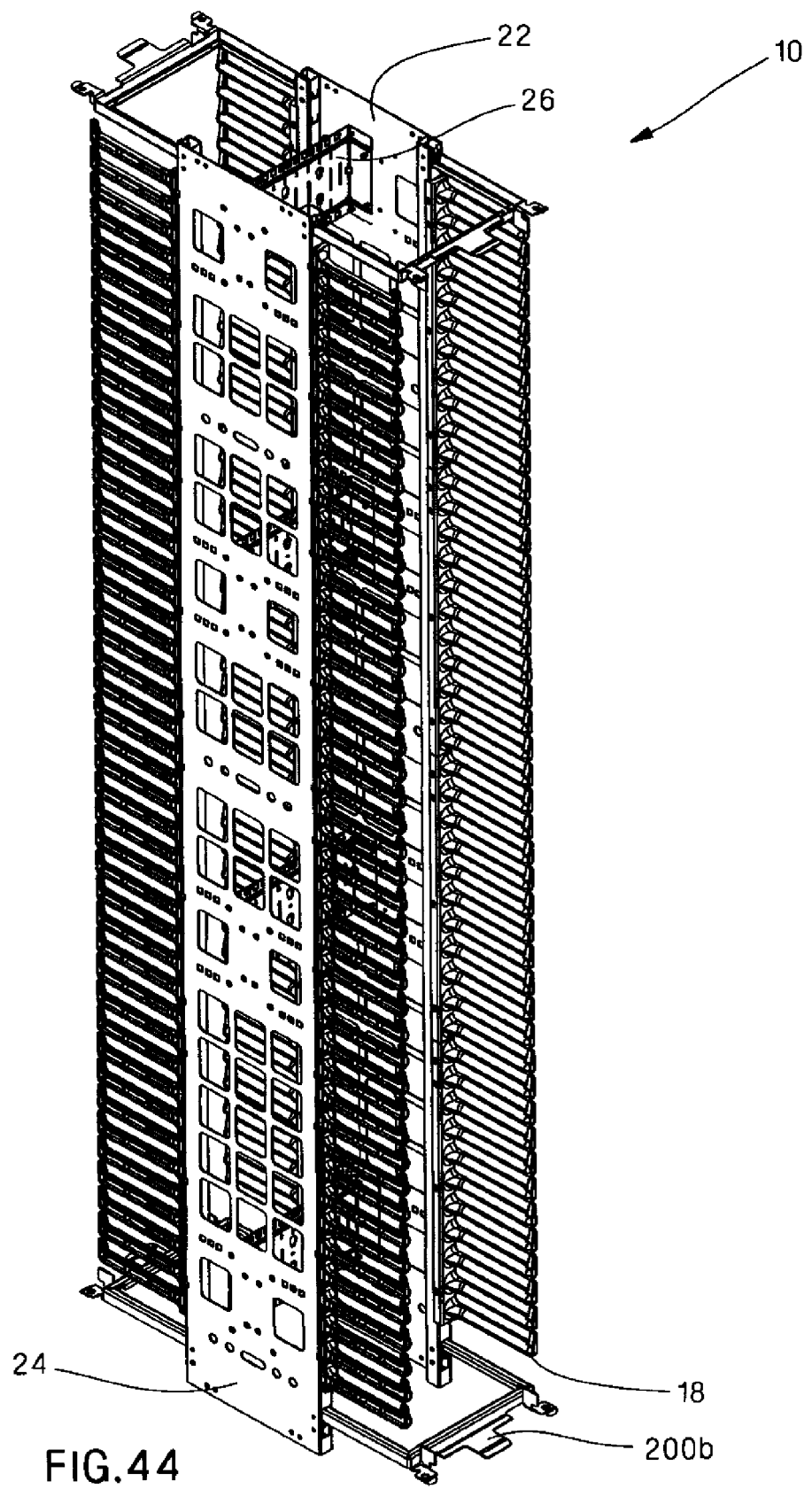
FIG. 44 is a perspective view of a cable manager according to an alternative embodiment of the present invention.
Figure 45:
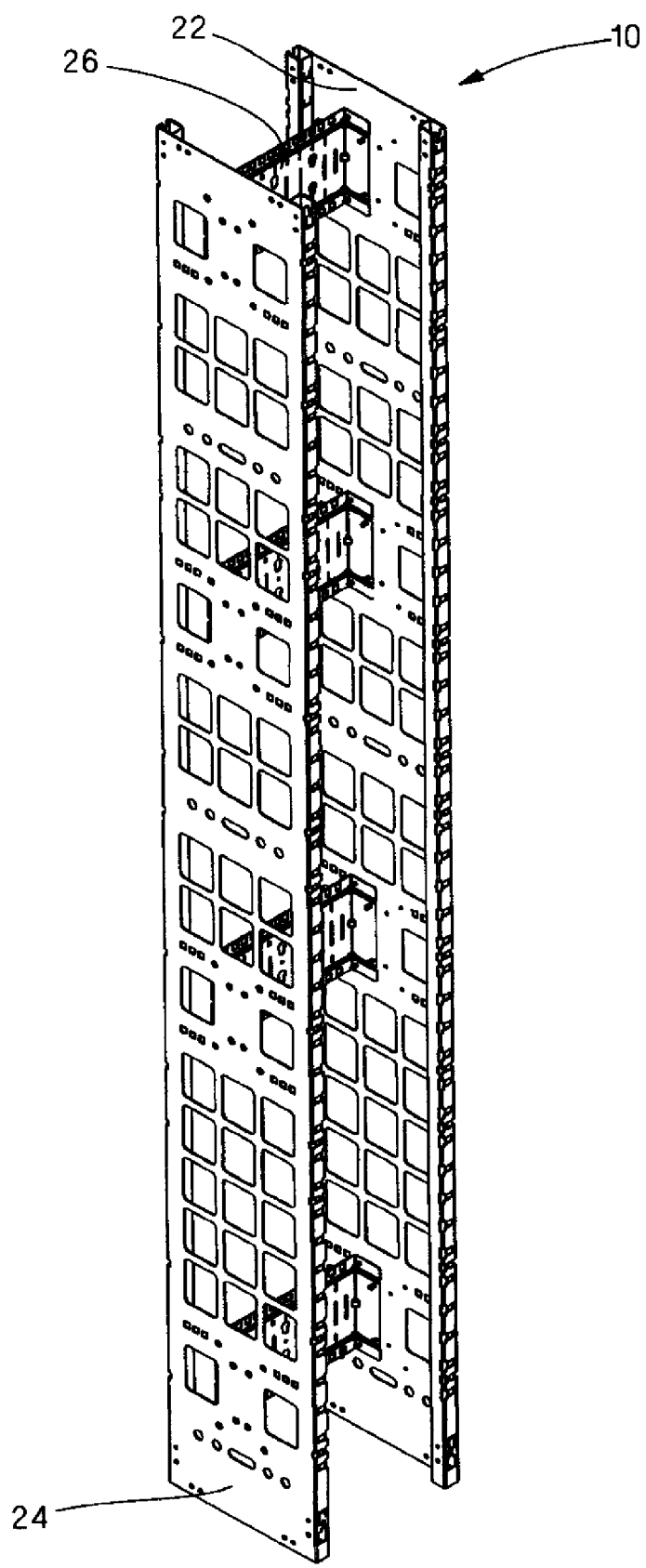
FIG. 45 is a perspective view of the cable manager of FIG. 44, showing the side panels and the cross brace brackets.
Figure 47:
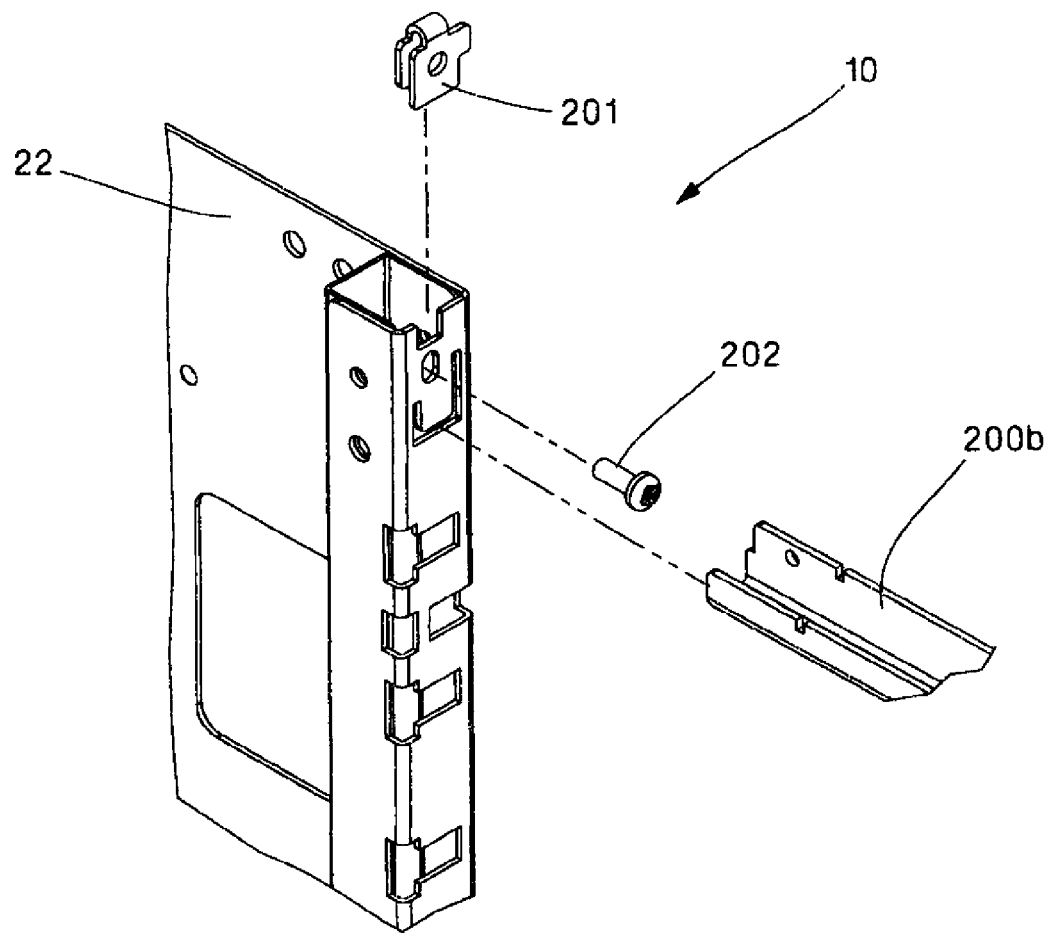
FIG. 47 is a detailed perspective view of the cable manager of FIG. 46, showing installation of the door brackets.

In certain embodiments of the present invention, cable manager 10 includes door brackets 200a (FIG. 38) or 200b (FIG. 44), which are removably connected to side panels 22 and 24. For example, as shown in FIG. 46 and FIG. 47, door bracket 200b is removably connected to side flange 30 of side panel 22 with retention clip 201 and retention screw 202.

The invention claimed is:

1. A cable manager comprising:
   a first side panel;
   a second side panel spaced apart from the first side panel;
   a first cross brace bracket rotatably connected to the first side panel along a first axis of rotation parallel to a first lengthwise direction of the first side panel and the second side panel along a second axis of rotation parallel to a second lengthwise direction of the second side panel; and
   a second cross brace bracket rotatably connected to the first side panel along the first axis of rotation and the second side panel along the second axis of rotation and spaced apart from the first cross brace bracket,
   wherein the first side panel, the second side panel, the first cross brace bracket, and the second cross brace bracket define a first cable pathway for routing a first plurality of cables and a second cable pathway for routing a second plurality of cables.

2. The cable manager of claim 1, further comprising a first plurality of fingers removably connected to the first side panel and extending outwardly therefrom in a first direction.

3. The cable manager of claim 2, further comprising a second plurality of fingers removably connected to the second side panel and extending outwardly therefrom in the first direction, wherein the first plurality of fingers and the second plurality of fingers further define the first cable pathway.

4. The cable manager of claim 3, further comprising a third plurality of fingers removably connected to the first side panel and extending outwardly therefrom in a second direction opposite the first direction.

5. The cable manager of claim 4, further comprising a fourth plurality of fingers removably connected to the second side panel and extending outwardly therefrom in the second direction, wherein the third plurality of fingers and the fourth plurality of fingers further define the second cable pathway.

6. The cable manager of claim 3, further comprising a cable ring removably connected to the first plurality of fingers.

7. The cable manager of claim 6, wherein the cable ring defines a third cable pathway within the first cable pathway.

8. The cable manager of claim 1, further comprising a door bracket removably connected to the side panels.

9. The cable manager of claim 8, further comprising a door rotatably connected to the door bracket.

10. The cable manager of claim 1, wherein the cross brace brackets are spaced apart according to the EIA-310 standard.

11. The cable manager of claim 1, further comprising a panel removably connected to the cross brace brackets.

12. The cable manager of claim 1, further comprising a multi-depth strain relief bar removably connected to the cross brace brackets.

13. The cable manager of claim 1, wherein the volume of the first cable pathway is equal to the volume of the second cable pathway.

14. The cable manager of claim 1, wherein the volume of the first cable pathway is greater than the volume of the second cable pathway.

15. The cable manager of claim 1, wherein each side panel comprises a plurality of cutouts for ventilation.

16. The cable manager of claim 15, wherein the cutouts are aligned with corresponding cutouts in a rack.

17. A cable manager comprising:
   a first side panel;
   a second side panel spaced apart from the first side panel;
   a first cross brace bracket rotatably connected to the first side panel and the second side panel;
   a second cross brace bracket rotatably connected to the first side panel and the second side panel and spaced apart from the first cross brace bracket; and
   a locking bracket slidably connected to at least one of the first cross brace bracket and the second cross brace bracket,
   wherein the first side panel, the second side panel, the first cross brace bracket, and the second cross brace bracket define a first cable pathway for routing a first plurality of cables and a second cable pathway for routing a second plurality of cables.

18. The cable manager of claim 17, wherein the cable manager is rotatable from a closed position to an open position.

19. The cable manager of claim 18, wherein the locking bracket locks the cable manager in the open position.

20. A cable manager comprising:
   a first side panel;
   a second side panel spaced apart from the first side panel;
   a first cross brace bracket rotatably connected to the first side panel and the second side panel; and
   a second cross brace bracket rotatably connected to the first side panel and the second side panel and spaced apart from the first cross brace bracket,
   wherein the first side panel, the second side panel, and the first cross brace bracket define a first cable pathway for routing a first plurality of cables and a second cable pathway for routing a second plurality of cables, and
   wherein the first side panel, the second side panel, and the second cross brace bracket further define the first cable pathway and the second cable pathway.

* * * * *